(12) United States Patent
Blais-Morin et al.

(10) Patent No.: US 11,830,256 B2
(45) Date of Patent: Nov. 28, 2023

(54) SYSTEMS AND METHODS FOR LOCATING A RETROREFLECTIVE OBJECT IN A DIGITAL IMAGE

(71) Applicant: GENETEC INC., Saint-Laurent (CA)

(72) Inventors: Louis-Antoine Blais-Morin, Saint-Laurent (CA); Pablo Augustin Cassani, Saint-Laurent (CA)

(73) Assignee: GENETEC INC., Saint-Laurent (CA)

( * ) Notice: Subject to any disclaimer, the term of this patent is extended or adjusted under 35 U.S.C. 154(b) by 9 days.

(21) Appl. No.: 17/828,725

(22) Filed: May 31, 2022

(65) Prior Publication Data

US 2022/0292800 A1 Sep. 15, 2022

Related U.S. Application Data

(63) Continuation of application No. 16/865,562, filed on May 4, 2020, now Pat. No. 11,367,267, which is a (Continued)

(51) Int. Cl.
*G06V 10/143* (2022.01)
*G06V 20/62* (2022.01)
(Continued)

(52) U.S. Cl.
CPC .............. *G06V 20/582* (2022.01); *G06T 7/73* (2017.01); *G06V 10/143* (2022.01);
(Continued)

(58) Field of Classification Search
CPC ................ G06V 10/141; G06V 20/625; G06V 30/1431; G06V 30/1434; G06V 30/1437; G06T 2207/10144; G06T 2207/10152
See application file for complete search history.

(56) References Cited

U.S. PATENT DOCUMENTS 5,381,155 A 1/1995 Gerber
5,757,286 A 5/1998 Jonsson et al.
(Continued)

FOREIGN PATENT DOCUMENTS

CN 203165216 U 8/2013
CN 105182320 A 12/2015
(Continued)

OTHER PUBLICATIONS

"Vision-based People Detection Utilizing Reflective Vests for Autonomous Transportation Application", Conference: IROS Workshop on Metrics and Methodologies for Autonomous Robot Teams in Logistics (MMART-LOG), San Francisco, USA, Sep. 2011, 6 pages.
(Continued)

*Primary Examiner* — Andrew W Johns

(57) ABSTRACT

Systems and methods are disclosed for locating a retroreflective object in a digital image and/or identifying a feature of the retroreflective object in the digital image. In certain environmental conditions, e.g. on a sunny day, or when the retroreflective material is damaged or soiled, it may be more challenging to locate the retroreflective object in the digital image and/or to identify a feature of the object in the digital image. The systems and methods disclosed herein may be particularly suited for object location and/or feature identification in situations in which there is a strong source of ambient light (e.g. on a sunny day) and/or when the retroreflective material on the object is damaged or soiled.

20 Claims, 18 Drawing Sheets

Related U.S. Application Data continuation of application No. 15/891,747, filed on Feb. 8, 2018, now Pat. No. 10,691,968.

(51) Int. Cl.
  *G06V 20/58* (2022.01)
  *G06T 7/73* (2017.01)

(52) U.S. Cl.
  CPC .. *G06V 20/584* (2022.01); *G06T 2207/30236* (2013.01); *G06T 2207/30252* (2013.01); *G06V 20/625* (2022.01)

(56) References Cited

U.S. PATENT DOCUMENTS

| | | | |
|---|---|---|---|
| 6,404,902 | B1 | 6/2002 | Takano et al. |
| 6,650,765 | B1 | 11/2003 | Alves |
| 7,982,634 | B2 | 7/2011 | Arrighetti |
| 8,331,621 | B1 * | 12/2012 | Allen et al. ............ G08G 1/015 348/148 |
| 8,526,677 | B1 | 9/2013 | Chricton et al. |
| 9,087,380 | B2 | 7/2015 | Lock |
| 9,142,010 | B2 | 9/2015 | Watts et al. |
| 9,270,875 | B2 | 2/2016 | Brisedoux et al. |
| 9,927,253 | B2 | 3/2018 | Clynne et al. |
| 10,691,968 | B2 | 6/2020 | Blais-Morin et al. |
| 10,755,571 | B1 | 8/2020 | Eather et al. |
| 2010/0131197 | A1 | 5/2010 | Zhang et al. |
| 2010/0151213 | A1 | 6/2010 | Smithson et al. |
| 2012/0242809 | A1 | 9/2012 | White et al. |
| 2013/0162799 | A1 | 6/2013 | Hanna et al. |
| 2013/0299517 | A1 | 11/2013 | Ciavarella et al. |
| 2014/0160283 | A1 * | 6/2014 | Hofman et al. ..... G06V 10/147 348/143 |
| 2015/0163390 | A1 | 6/2015 | Lee et al. |
| 2016/0232410 | A1 | 8/2016 | Kelly et al. |
| 2016/0241839 | A1 | 8/2016 | Crona |
| 2016/0300354 | A1 | 10/2016 | Fetzer et al. |
| 2017/0075888 | A1 | 3/2017 | Ekin |
| 2017/0148102 | A1 | 5/2017 | Franke et al. |
| 2017/0286794 | A1 | 10/2017 | Aoyama et al. |
| 2018/0137368 | A1 | 5/2018 | Newman |
| 2018/0268687 | A1 | 9/2018 | Che et al. |
| 2019/0166355 | A1 | 5/2019 | Banks et al. |
| 2019/0244045 | A1 | 8/2019 | Blais-Morin et al. |
| 2019/0287297 | A1 | 9/2019 | Abrhiram et al. |
| 2019/0318622 | A1 | 10/2019 | Shideler et al. |
| 2020/0265258 | A1 | 8/2020 | Blais-Morin et al. |
| 2020/0311435 | A1 | 10/2020 | Kucharski et al. |
| 2020/0327343 | A1 | 10/2020 | Lund et al. |
| 2021/0124966 | A1 | 4/2021 | Blais-Morin et al. |

FOREIGN PATENT DOCUMENTS

| | | | |
|---|---|---|---|
| CN | 105844266 | A | 8/2016 |
| CN | 106682611 | A | 5/2017 |
| CN | 107195004 | B | 5/2018 |
| CN | 108022429 | A | 5/2018 |
| CN | 207380911 | U | 5/2018 |
| CN | 109544707 | A | 3/2019 |
| CN | 110264729 | A | 9/2019 |
| CN | 110322702 | A | 10/2019 |
| CN | 110458897 | A | 11/2019 |
| CN | 209625442 | U | 11/2019 |
| CN | 110930716 | A | 3/2020 |
| CN | 110285793 | B | 5/2020 |
| JP | 2007047876 | A | 2/2007 |
| KR | 20050020350 | A | 3/2005 |
| KR | 100541865 | B1 | 1/2006 |
| KR | 20120000373 | A | 1/2012 |
| KR | 101151523 | B1 | 5/2012 |
| KR | 20140000402 | A | 1/2014 |
| KR | 101392357 | B1 | 5/2014 |
| KR | 101794308 | B1 | 12/2017 |
| KR | 101828558 | B1 | 2/2018 |
| WO | 2011044149 | A1 | 4/2011 |
| WO | 2017059527 | A1 | 4/2017 |
| WO | WO-2017173017 | A1 * | 10/2017 ............ G08G 1/017 |
| WO | 2018049514 | A1 | 3/2018 |
| WO | 2019066770 | A1 | 4/2019 |

OTHER PUBLICATIONS

"Ambient-Light-Canceling Camera Using Subtraction of Frames", NASA Tech Briefs, May 2004, 2 pages.

"cl_intel_motion_estimation", Intel, published at least as early as Mar. 18, 2016, but enclosed printed copy is from Dec. 5, 2017, 5 pages, can be accessed at https://222.khronos.org/registry/OpenCL/extensions/intel/cl_intel_motion_estimation.txt, 5 pages.

"Intro to Motion Estimation Extension for OpenCL".Intel, published at leastas early as Nov. 2013, but enclosed printed copy is from Dec. 5, 2017, 9 pages, can be accessed at https://software.intel.com/en-us/articles/intro-to-motion-estimatin-extension-for-opencl, 9 pages.

"Scale-invariant feature transform", Wikipedia, published at least as early as Nov. 26, 2017, but enclosed printed copy is from Dec. 5, 2017, 16 pages, can be accessed at https://en.wikipedia.org/wiki/Scale-invariant_feature_transform, 16 pages.

"Optical flow", Wikipedia, published at least as early as Sep. 29, 2017, but enclosed printed copy is from Dec. 5, 2017, 5 pages, can be accessed at https://en.wikipedia.org/wiki/Optical_flow.

"An efficient method of license plate location", Pattern Recognition Letters, vol. 26, Jun. 2005, 8 pages.

"Ambient Light Rejection Camera", Pixim Eclipse Product Brief, Sep. 2008, 2 pages.

"A License Plate-Recognition Algorithm for Intelligent Transporation SystemApplications", IEEE Transactions in Intelligent Transportation Systems, vol. 7 (3), Sep. 2006, 16 pages.

Non Final Office Action dated Nov. 22, 2019 in connection with U.S. Appl. No. 15/891,747, (10 pages).

Notice of Allowance dated Feb. 27, 2020 in connection with U.S. Appl. No. 15/891,747, 8 pages.

Written Opinion and International Search Report dated Nov. 23, 2020 in connection with International application No. PCT/CA2020/051075.

Notice of Allowance dated Feb. 18, 2022 in connection with U.S. Appl. No. 16/865,562, 7 pages.

* cited by examiner

Obtain a plurality of digital images, including a first image and a second image
952

Process the first image and the second image to locate an object
954

FIG. 22

SYSTEMS AND METHODS FOR LOCATING A RETROREFLECTIVE OBJECT IN A DIGITAL IMAGE

CROSS-REFERENCE TO RELATED APPLICATIONS

This application is a continuation of U.S. patent application Ser. No. 16/865,562, filed on May 4, 2020, which is a continuation of U.S. patent application Ser. No. 15/891,747 filed on Feb. 8, 2018 (now U.S. Pat. No. 10,691,968). The contents of the aforementioned applications are incorporated by reference herein.

FIELD

The following relates to locating a retroreflective object in a digital image and/or identifying a feature of the retroreflective object in the digital image.

BACKGROUND

A retroreflective material is a material that reflects light back to its source with a minimum of scattering. Retroreflective material may be used to increase the conspicuity of items such as traffic signs, license plates, parts of vehicles, obstructions, clothing etc., particularly at nighttime.

A camera may take a digital photograph of a scene to acquire a digital image. The scene may include a retroreflective object, i.e. an object having a retroreflective material. A processor may be configured to locate the object in the digital image. The processor may further be configured to identify features of the object in the digital image. The retroreflective properties of the object may cause the object to be more conspicuous in the digital image compared to the surrounding scene in the digital image. This may assist the processor in locating the object and/or identifying features of the object in the digital image.

For example, vehicle license plates are typically retroreflective. An automatic license plate recognition (ALPR) system may take a digital photograph of a vehicle to acquire a digital image, and then search for the license plate in the digital image. The ALPR system may further process the located license plate in the digital image in order to determine the symbols of the vehicle's license registration identifier. The retroreflective properties of the license plate may allow for the ALPR system to more easily locate the license plate in the digital image and/or more easily determine the vehicle's license registration identifier on the license plate.

As another example, street signs are typically retroreflective. An automatic recognition system on an autonomous vehicle may take a digital photograph of the scene in front of the vehicle to acquire a digital image, and then search for a traffic sign in the digital image. The system may further process a located traffic sign in the digital image in order to determine the information being conveyed by that traffic sign. The retroreflective properties of the traffic sign may allow for the system to more easily locate the traffic sign in the digital image and/or more easily determine the information being conveyed by the traffic sign.

SUMMARY

In certain environmental conditions, e.g. on a sunny day, or when the retroreflective material is damaged or soiled, it may be more challenging to locate a retroreflective object in a digital image and/or to identify a feature of the retroreflective object in the digital image.

Systems and methods are disclosed herein for locating a retroreflective object in a digital image and/or identifying a feature of the retroreflective object in the digital image. The systems and methods may be particularly suited for situations in which there is strong source of ambient light (e.g. on a sunny day) and/or when the retroreflective material on the object is damaged or soiled.

According to one embodiment, there is provided a system that includes at least one image acquisition device. The at least one image acquisition device acquires a plurality of digital images. The plurality of digital images includes a first image acquired with light emitted from an illuminator, and a second image acquired without or with less of the light emitted from the illuminator. The system further includes a memory to store the plurality of digital images. The system further includes a processor to generate a compound image from the first image and the second image. The processor may also be configured to align content of the first image and the second image prior to generating the compound image. The processor may also be configured to locate an object in the compound image.

In another embodiment, there is provided a system including a memory to store a plurality of digital images. The plurality of digital images includes a first image that was acquired with light emitted from an illuminator, and a second image that was acquired without or with less of the light emitted from the illuminator. The system also includes a processor to generate a compound image from the first image and the second image. The content of the first image and the second image may first be aligned before generating the compound image. The processor may also be configured to locate an object in the compound image.

In another embodiment, there is provided a method including activating an illuminator to emit light, and acquiring a first image with light emitted from the illuminator. The method may further include acquiring a second image without or with less of the light emitted from the illuminator. The method may further include generating a compound image from the first image and the second image. The method may further include aligning content of the first image and the second image prior to generating the compound image. The method may further include locating an object in the compound image.

In another embodiment, there is provided a method including retrieving from memory a plurality of digital images. The plurality of digital images includes a first image that was acquired with light emitted from an illuminator, and a second image that was acquired without or with less of the light emitted from the illuminator. The method may further include generating a compound image from the first image and the second image. The method may further include aligning content of the first image and the second image prior to generating the compound image. The method may further include locating an object in the compound image.

In another embodiment, there is provided a system for recognizing a vehicle license plate. The system includes a memory to store a plurality of digital images. The plurality of digital images includes a first image that was acquired with light emitted from an illuminator, and a second image that was acquired without or with less of the light emitted from the illuminator. The system further includes a processor to process the first image and the second image to locate the vehicle license plate.

In another embodiment, there is provided a method for recognizing a vehicle license plate. The method may include retrieving from memory a plurality of digital images. The plurality of digital images may include a first image that was acquired with light emitted from an illuminator, and a second image that was acquired without or with less of the light emitted from the illuminator. The method may further include processing the first image and the second image to locate the vehicle license plate.

In another embodiment, there is provided a method that includes activating an illuminator to emit light, and acquiring a first image with light emitted from the illuminator. The method may further include acquiring a second image without or with less of the light emitted from the illuminator. The method may further include generating a compound image from the first image and the second image. The method may further include searching for a vehicle license plate in the compound image.

In another embodiment, there is provided a system including at least one image acquisition device to acquire a plurality of digital images. The plurality of digital images includes a first image acquired with light emitted from an illuminator, and a second image acquired without or with less of the light emitted from the illuminator. The system further includes a memory to store the plurality of digital images. The system further includes a processor. The processor is configured to generate a compound image from the first image and the second image. The processor may be further configured to search for a vehicle license plate in the compound image. The system may further include the illuminator.

BRIEF DESCRIPTION OF THE DRAWINGS

Embodiments will be described, by way of example only, with reference to the accompanying figures wherein:

FIG. 22 is a flowchart of a method performed by an automatic recognition system, according to another embodiment.

DETAILED DESCRIPTION

For illustrative purposes, specific embodiments and examples will be explained in greater detail below in conjunction with the figures.

Figure 1:
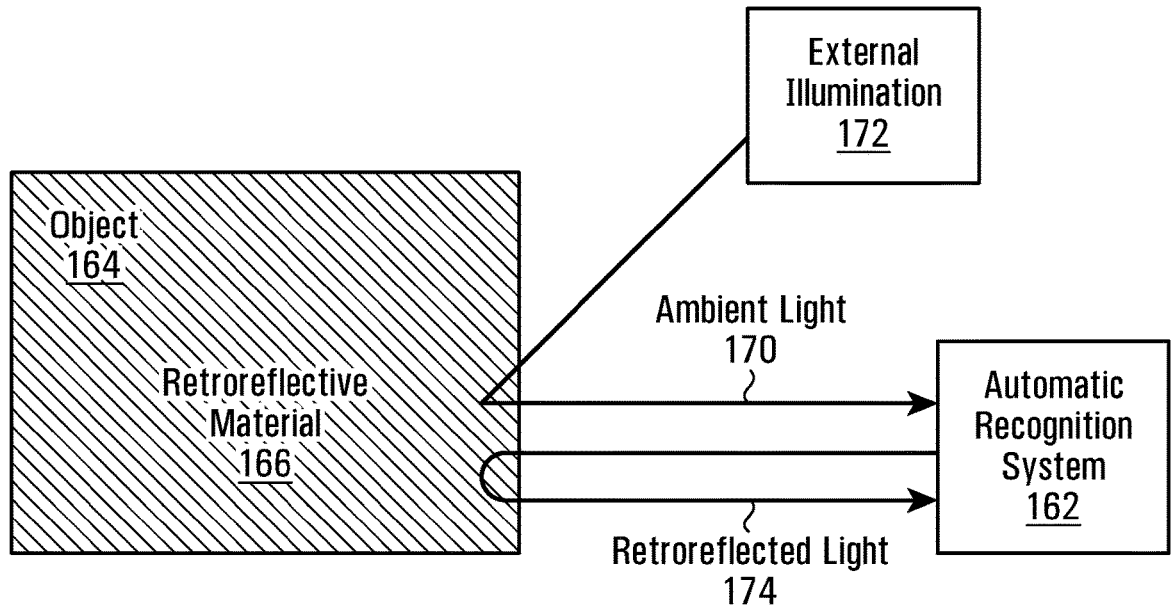
FIG. 1 is a block diagram illustrating an automatic recognition system for locating an object, according to one embodiment.

FIG. 1 is a block diagram illustrating an automatic recognition system 162 for locating an object 164, according to one embodiment. The object 164 comprises a retroreflective material 166. Light reflected off of the object 164 may include ambient light 170 originating from a source of external illumination 172, such as the sun. Light reflected off of the object 164 may also include retroreflected light 174 from an illuminator in the automatic recognition system 162. The automatic recognition system 162 is configured to attempt to automatically locate the object 164, and possibly identify one or more features of the object.

Figure 2:
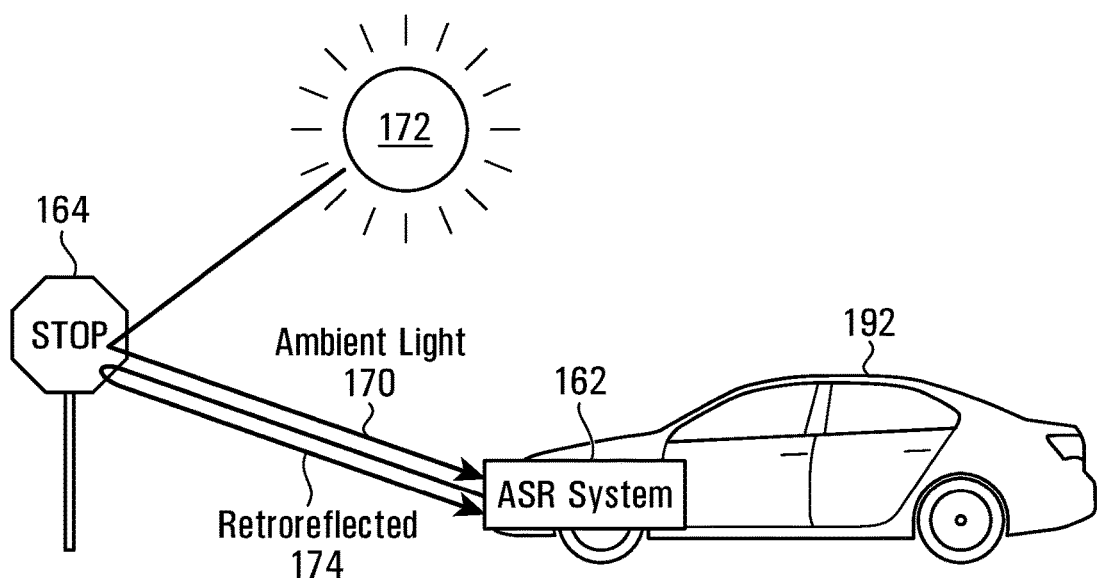
FIG. 2 illustrates an example implementation in which the automatic recognition system is configured to recognize a traffic sign.

FIG. 2 illustrates an example implementation in which the automatic recognition system 162 is configured to locate a traffic sign 164, in which case the automatic recognition system 162 may be called an automatic sign recognition (ASR) system. In FIG. 2, the ASR system is installed on an autonomous vehicle 192. Besides retroreflected light, there may be ambient light from the sun.

Figure 3:
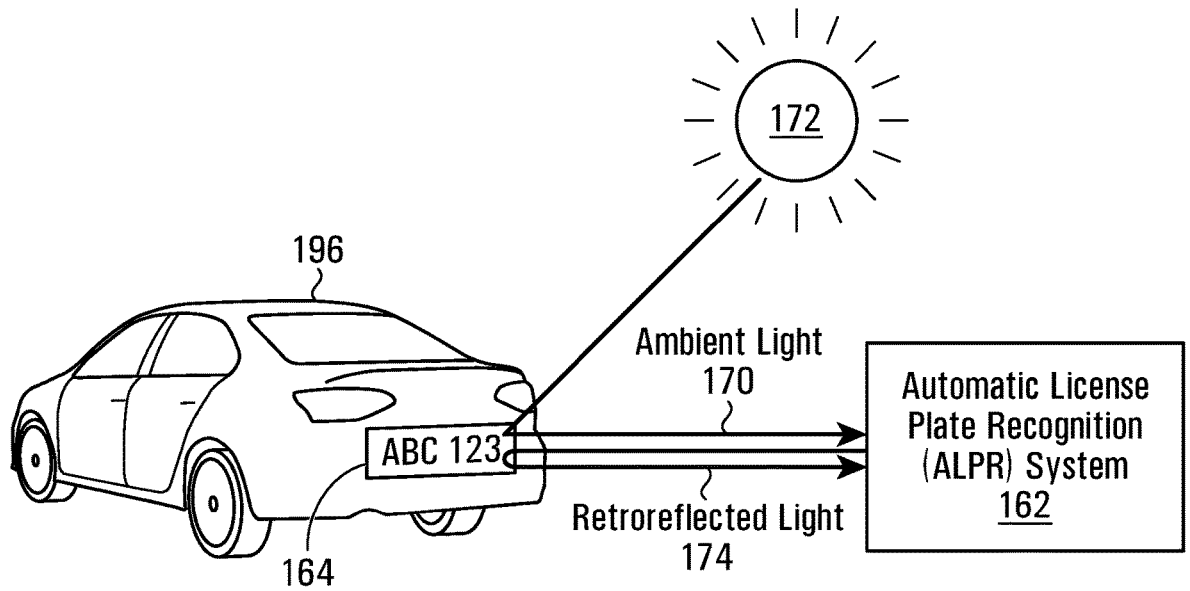
FIG. 3 illustrates an example implementation in which the automatic recognition system is configured to recognize a license plate on a vehicle.

FIG. 3 illustrates an example implementation in which the automatic recognition system 162 is configured to locate a license plate 164 on a vehicle 196, in which case the automatic recognition system 162 may be called an automatic license plate recognition (ALPR) system. In FIG. 3, the ALPR system may be installed above a road. Besides retroreflected light, there may be ambient light from the sun.

Figure 4:
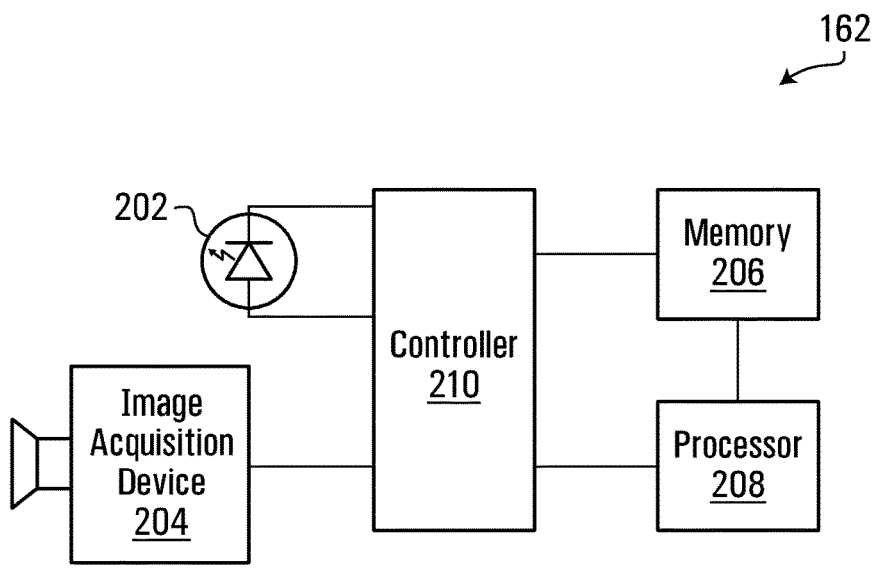
FIG. 4 is a block diagram illustrating one example of the automatic recognition system.

FIG. 4 is a block diagram illustrating one example of the automatic recognition system 162. The automatic recognition system 162 includes an illuminator 202 that emits light. The light is meant to be reflected off of the retroreflective material 166 of the object 164 to result in retroreflected light 174. The illuminator 202 is illustrated as a light emitting diode (LED) to show that the illuminator 202 may comprise one or more LEDs, but this is only an example. Any other light emitting source may be used instead. The light emitted from the illuminator 202 may or may not be visible light, e.g. it may be infrared light.

The automatic recognition system 162 further includes an image acquisition device 204 for acquiring digital images. The image acquisition device 204 may be any device for acquiring digital images, e.g. using a sensor such as a charge coupled device (CCD) sensor or a complementary metal-oxide-semiconductor (CMOS) sensor. In the embodiments below, the image acquisition device 204 is a digital camera. The digital camera 204 is located relatively close to the illuminator 202 so that the digital camera 204 may capture light reflected off of the retroreflective material 166 back at the illuminator 202. The illuminator 202 may be the flash for the digital camera 204. When the digital camera 204 is actuated to take a digital photograph, an aperture (not shown) on the digital camera 204 opens and the incoming light rays are detected using a sensor (not shown). The digital camera 204 converts the incoming light rays into a digital image.

An acquired digital image comprises a grid of pixels. Each pixel has a location coordinate (x, y) indicating the location of the pixel in the digital image, as well as a corresponding pixel value Y(x, y). The pixel value represents the intensity of the pixel at the pixel coordinate. A pixel value may have an intensity consisting of a single component, e.g. when the camera 204 provides a monochromatic output, as is typical with infrared cameras. In other embodiments, a pixel value may have an intensity consisting of different components, e.g. a red, green, and blue component, or a luminance (Y), blue-difference chroma (Cb), and red-difference chroma (Cr) component if the image taken by the camera 204 is a colour image. In the case of multi-component pixels, the pixel value may be the value of a single component (typically luminance) or a value derived as a function of multiple components. In one embodiment, the camera 204 captures monochromatic images, and the pixel value of each pixel in a captured monochromatic image is a single luminance component that represents the intensity of that pixel.

Each captured digital image is stored in a memory 206. A processor 208 processes one or more digital images stored in the memory 206 in order to detect the object 164 in a digital image and/or in order to identify one or more features of the object in the digital image. A controller 210 controls actuation of the camera 204 to acquire digital images, and also controls activation/deactivation of the illuminator 202 to synchronize turning on/off the light emitted by the illuminator 202. For example, as explained later in relation to FIG. 11, the controller 210 may generate a series of pulses, each pulse controlling the camera 204 to expose and capture a digital image. The controller 210 may further generate another series of pulses, each pulse causing the illuminator 202 to emit light, and a period between adjacent pulses being twice the length of the period between adjacent pulses controlling the camera 204. In this way, the controller 210 may synchronize light emission by the illuminator 202 with acquisition of every other digital image.

The controller 210 may be fully or partially included as part of the processor 208. Therefore, when "controller" is used herein, it may be replaced with "processor" instead. The processor 208 and controller 210 may each be implemented by one or more processors that execute instructions stored in memory 206. The instructions, when executed, cause the processor 208 and controller 210 to perform the operations described herein, e.g. subtracting images, aligning content between images, locating the object 164 in an image, identifying features of the object 164, controlling/synchronizing activation/deactivation of the illuminator 202, controlling actuation of the camera 204, etc. Alternatively, some or all of the processor 208 and/or controller 210 may be implemented using dedicated circuitry, such as an application specific integrated circuit (ASIC), a graphics processing unit (GPU), or a programmed field programmable gate array (FPGA) for performing the operations of the processor 208 and/or controller 210.

Figure 5:
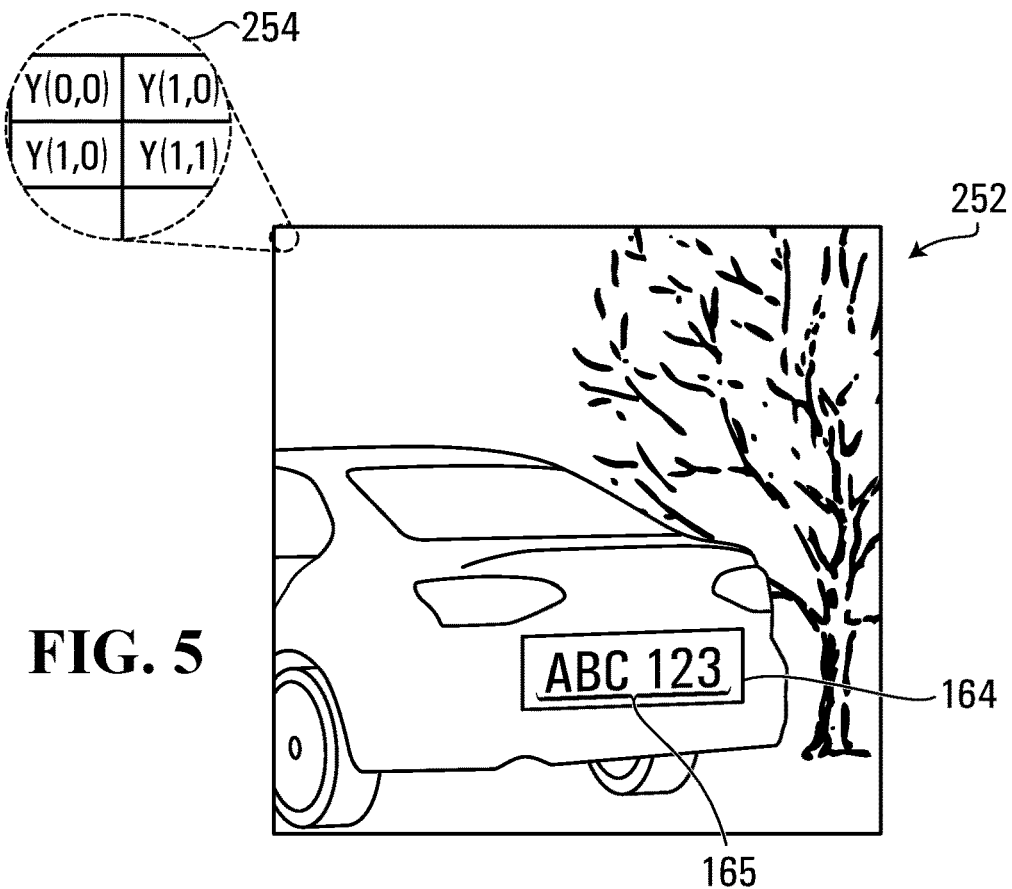
FIG. 5 illustrates an example of a digital image.

FIG. 5 illustrates an example of a digital image 252 acquired by the digital camera 204. In FIG. 5, the object 164 is a license plate, and the feature of interest to be identified in the object 164 is the vehicle registration identifier 165. The digital image 252 consists of a grid of pixels. The individual pixels are not shown in FIG. 5, except for in magnified portion 254. The magnified portion 254 illustrates a few pixels around coordinate (x, y)=(0, 0), each having a respective pixel value Y(x, y).

Figure 6:
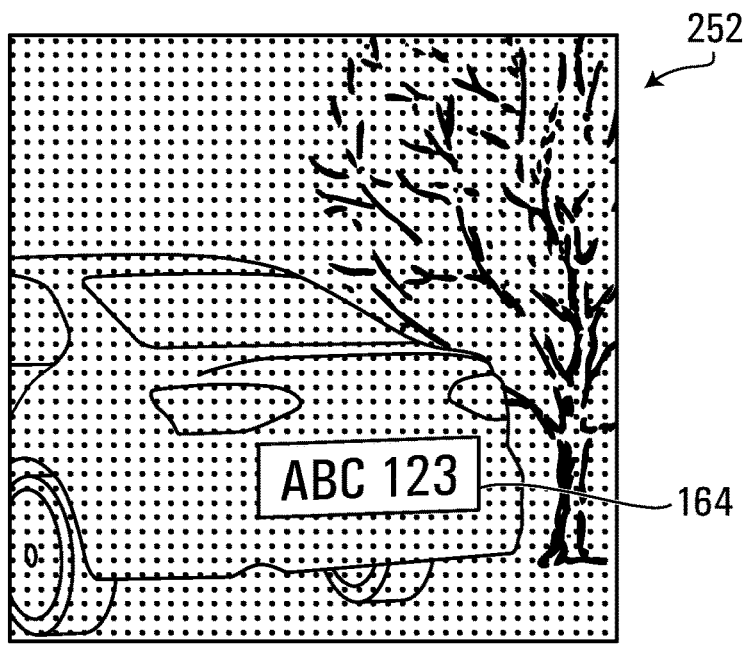
FIGS. 6 to 9 illustrate a digital image of a license plate in different environmental conditions.
Figure 7:
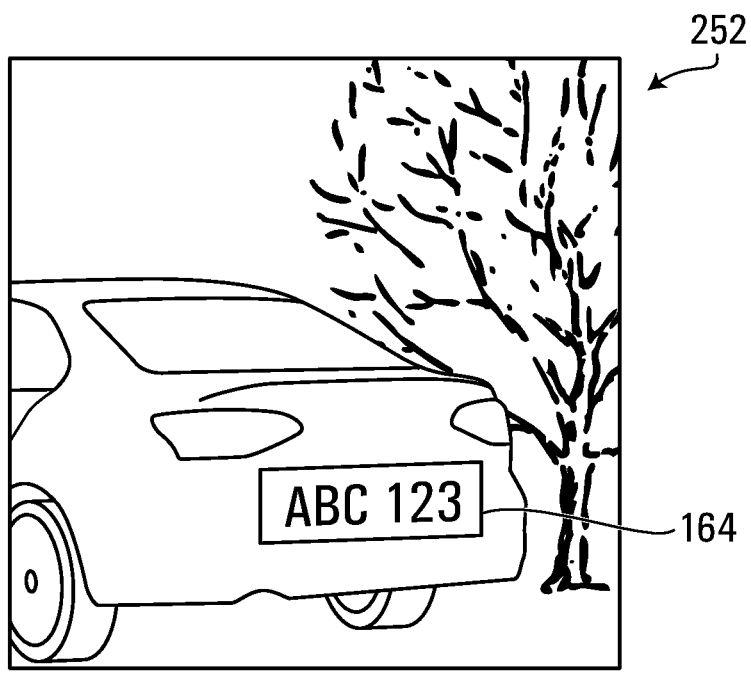

The retroreflective material 166 on the object 164 may facilitate locating the object 164 in the digital image and/or identifying one or more features of the digital object 164, particularly when there is not much ambient light. As an example, assume the automatic recognition system 162 is used to locate and read license plate 164 in digital image 252 of FIG. 5. The illuminator 202 emits light, and the license plate 164 reflects a significant portion of the light back at the illuminator 202 and digital camera 204. Most, if not all, other surrounding objects captured in the digital image 252 will not be retroreflective. Therefore, relatively less light emitted by the illuminator 202 and reflected off of the surrounding objects will be returned towards the camera 204. Assuming there is not much ambient light, e.g. at night time, then the license plate 164 will appear relatively conspicuous in the digital image 252, as shown in FIG. 6. However, if there is a strong source of ambient light, such as on a sunny day, then the license plate 164 will not be much more conspicuous in the digital image 252 compared to the surrounding objects in the digital image, e.g. as shown at FIG. 7.

Figure 8:
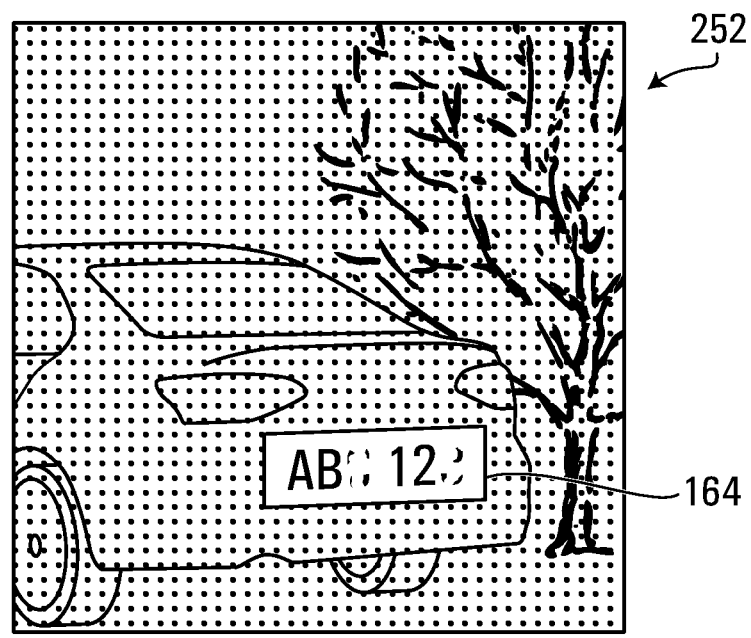
Figure 9:
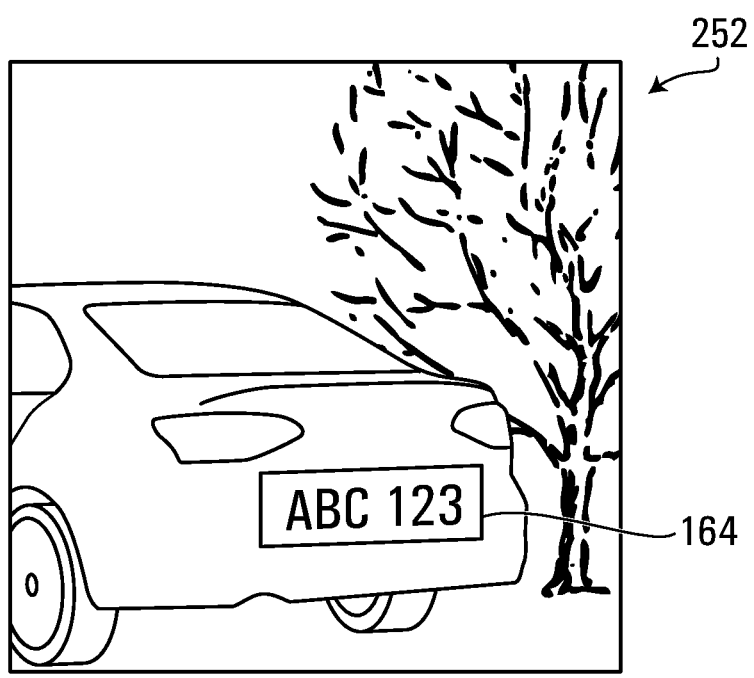

Another problem may arise when the retroreflective material 166 on the object 164 is damaged or soiled, which may result in a poor quality image when the illuminator 202 is used. In such a situation, feature identification by the processor 208 may actually be more difficult compared to only using ambient light to capture the image. For example, FIG. 8 illustrates the digital image 252 of the license plate 164 when illuminator 202 is used to try to make the license plate 164 more conspicuous, but the retroreflective material 166 on the license plate 164 is damaged. The license plate 164 may be more conspicuous than the surrounding scene, but the areas on the plate 164 at which the retroreflective material is damaged may be difficult to read by the processor 208. However, assuming ambient light is present, e.g. during daylight hours, then it may be easier for the processor 208 to read the license plate 164 when the illuminator 202 is not turned on. For example, FIG. 9 illustrates the digital image 252 captured during daylight hours without the illuminator 202 turned on. It may be easier for the processor 208 to read the vehicle registration identifier on the license plate 164 because the damaged retroreflective material is not emphasized/distorted by retroreflected light. However, it may be more difficult for the processor 208 to locate the license plate 164 in the digital image 252 of FIG. 9 because the license plate 164 has approximately the same intensity as the surrounding objects in the digital image of the scene.

The technical problems discussed above are presented in the context of automatic license plate recognition. However, it will be appreciated that similar technical problems may exist in other applications that use automatic object recognition, e.g. when automatically locating and/or identifying features in a traffic sign, or when automatically recognizing the presence of another vehicle or obstruction on the road having a retroreflective material, which may be applicable for autonomous vehicles, or for driver assistance systems (e.g. that perform object detection around a vehicle to help a human driver).

Embodiments described below aim to address at least some of the technical problems described above by providing an improvement in a technological system for automatic object recognition. Embodiments described below aim to provide specific enhanced non-generic computer functionality.

In some embodiments below, at least one image acquisition device (e.g. a digital camera) is used to acquire a plurality of digital images of an object comprising a retroreflective material. The plurality of digital images includes at least a first image and a second image. The first image is acquired with light emitted from the illuminator. Therefore, the first image includes both retroreflective light and ambient light, and the pixel intensities of the first image will be proportional to the light intensity of the retroreflective light and ambient light. A second image is acquired without the light emitted from the illuminator. Therefore, the second image only includes the ambient light, and the pixel intensities of the second image will be proportional to the light intensity of the ambient light. The processor may then subtract the second image from the first image to result in a compound image having at least some of the ambient light removed. The subtraction may comprise, for each pixel coordinate, subtracting the pixel value at that coordinate in the second image from the pixel value at that coordinate in the first image to obtain a difference value, and then using the difference value as the pixel value at that coordinate in the compound image. In some embodiments, the difference value may be an absolute value of the difference, however in one example, the difference value is a subtraction whereby the pixel value is set to zero if the subtraction results in a negative number.

In some embodiments, a pixel value used in the subtraction operation may have only one component representing intensity (e.g. in the case of an infrared image). In other embodiments, a pixel value used in the subtraction operation may include multiple components (e.g. Y, Cb, Cr). In other embodiments, a pixel value used in the subtraction operation may be a function of multiple components. For example, a pixel value may be a single value that represents only the Y component of that pixel, or may be a single value that represents some combination of Y, Cb, and Cr for that pixel, or may be a single value that represents the original pixel value, or one component of the original pixel value, further modified by a function. In any case, if the pixel values used in the subtraction have more than one component, then in one embodiment the subtraction occurs at each respective component.

After the subtraction occurs to generate the compound image, the processor may then locate the object in the compound image. It may be easier to locate the object in the compound image compared to in the first image or the second image, because at least some of the ambient light has been removed from the compound image. This may particularly be the case when there is a strong source of ambient light present in the environment, such as on a sunny day. In the compound image, the retroreflective object will generally be more conspicuous than the surrounding scene in the compound image. This is because at least some of the ambient light has been removed from the compound image, and the retroreflective light still present in the image will largely comprise light reflected directly back from the retroreflective object, rather than from other non-retroreflective items in the scene that scatter the light from illuminator. The pixel intensities of the compound image will be proportional to the light intensity of the light emitted from the illuminator and reflected back at the camera, which will mostly be the retroreflected light from the object. The retroreflective object will therefore have pixel values that, in general, have a higher intensity than the pixel values of the scene surrounding the retroreflective object.

Figure 10:
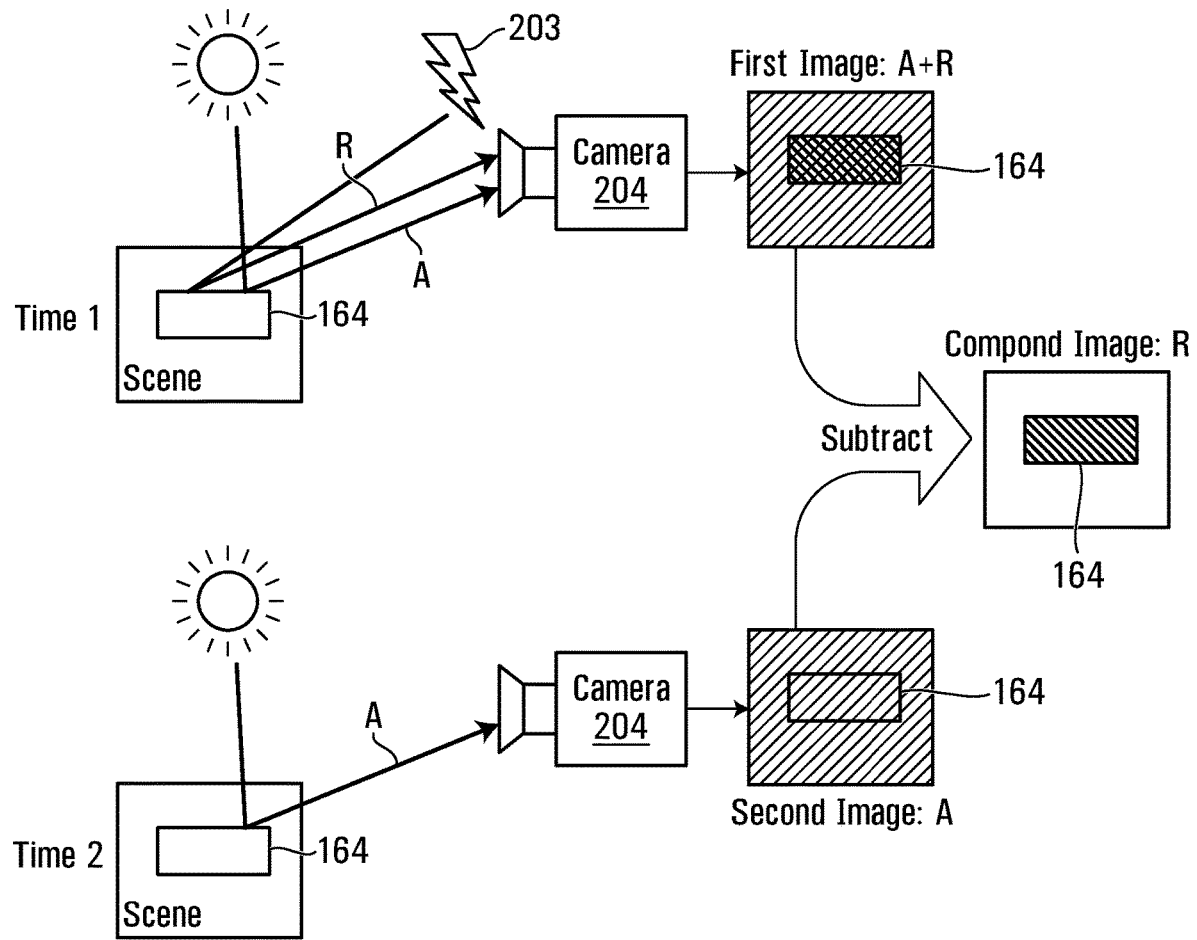
FIG. 10 illustrates an example process of image acquisition and subtraction using an automatic recognition system.

FIG. 10 illustrates an example of the process of image acquisition and subtraction using automatic recognition system 162. At time 1, the illuminator 202 is activated and emits light 203 that is retroreflected off of the object 164. Ambient light is also reflected off of the object 164. The first image is acquired by the camera 204 and includes retroreflected light "R" and ambient light "A". At time 2, the illuminator 202 is deactivated and therefore does not emit light 203. The second image is acquired by camera 204 and includes only the ambient light "A". The processor 208 subtracts the second image from the first image to result in a compound image in which ambient light A is reduced or eliminated: (R+A)−A=R. The object 164 will typically be more conspicuous in the compound image compared to in the first image or second image, particularly when there is a lot of ambient light in the environment. This is because the ambient light is reduced or eliminated in the compound image, and since the object 164 is retroreflective, much of the retroreflective light R will comprise light reflected directly back from the object 164, compared to other non-retroreflective items in the scene that scatter the light 203 from illuminator 202. The object 164 in the compound image will therefore have pixel values that, in general, have a higher intensity than the pixel values of the scene surrounding the retroreflective object in the compound image.

Figure 11:
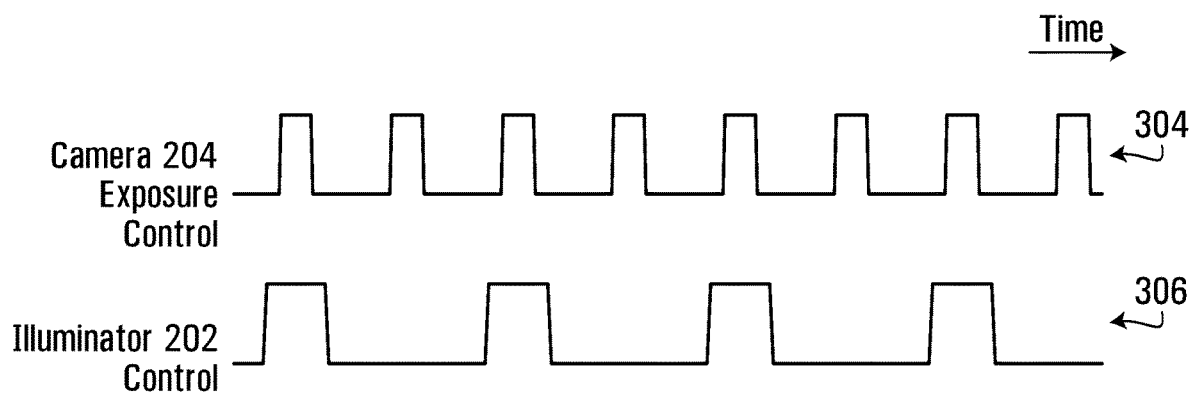
FIG. 11 illustrates control pulses for actuating an image acquisition device and an illuminator.

In order to generate first and second images over time, the controller 210 may control the camera 204 to actuate and take a digital photograph on a regular basis, e.g. every $1/45^{th}$ of a second, and the controller 210 may control the illuminator 202 to emit light during every other digital photograph. For example, FIG. 11 illustrates a first control pulse 304 used to actuate the camera 204. When the first control pulse 304 is 'high', the camera is actuated and exposes to take a digital photograph. A second control pulse 306 is used to activate/deactivate the illuminator 202. When the second control pulse 306 is 'high', the illuminator 202 is activated and emits light. When the second control pulse 306 is 'low', the illuminator 202 is deactivated and does not emit light. A counter or state machine may be used to generate control pulses 304 and 306. In one embodiment, the controller 210 comprises control signaling logic to generate control signals 304 and 306 to control the camera 204 and illuminator 202. In the example shown in FIG. 11, the camera 204 and the illuminator 202 are controlled by pulses. The control signaling logic may comprise logic for receiving input indicating a prescribed camera and illuminator use and timing, and for generating as a function of that input the control signals, in this example pulses. Also, the control signals generated by the controller 210 are shown in FIG. 11 as simple binary pulses, but other control signaling may be used instead. For example, the control signals may comprise digital signalling transmitting digital instructions in a format understood by the illuminator 202 and/or camera 204 and transmitting operational instructions to cause the activation or deactivation of the illuminator 202, the capture of a digital image or other functions. Likewise, while the control signaling provides timing instructions in this example by way of the timing of the pulses themselves, timing instructions may be provided as a digital timing instruction specifying the timing of illumination and/or image capture. For example, a digital timing instruction may comprise a frequency of operation for the illuminator 202, for the camera 204 or for both, particularly if they are operating under common timing, e.g. a same clock or mutually synchronized timekeeping.

Figure 12:
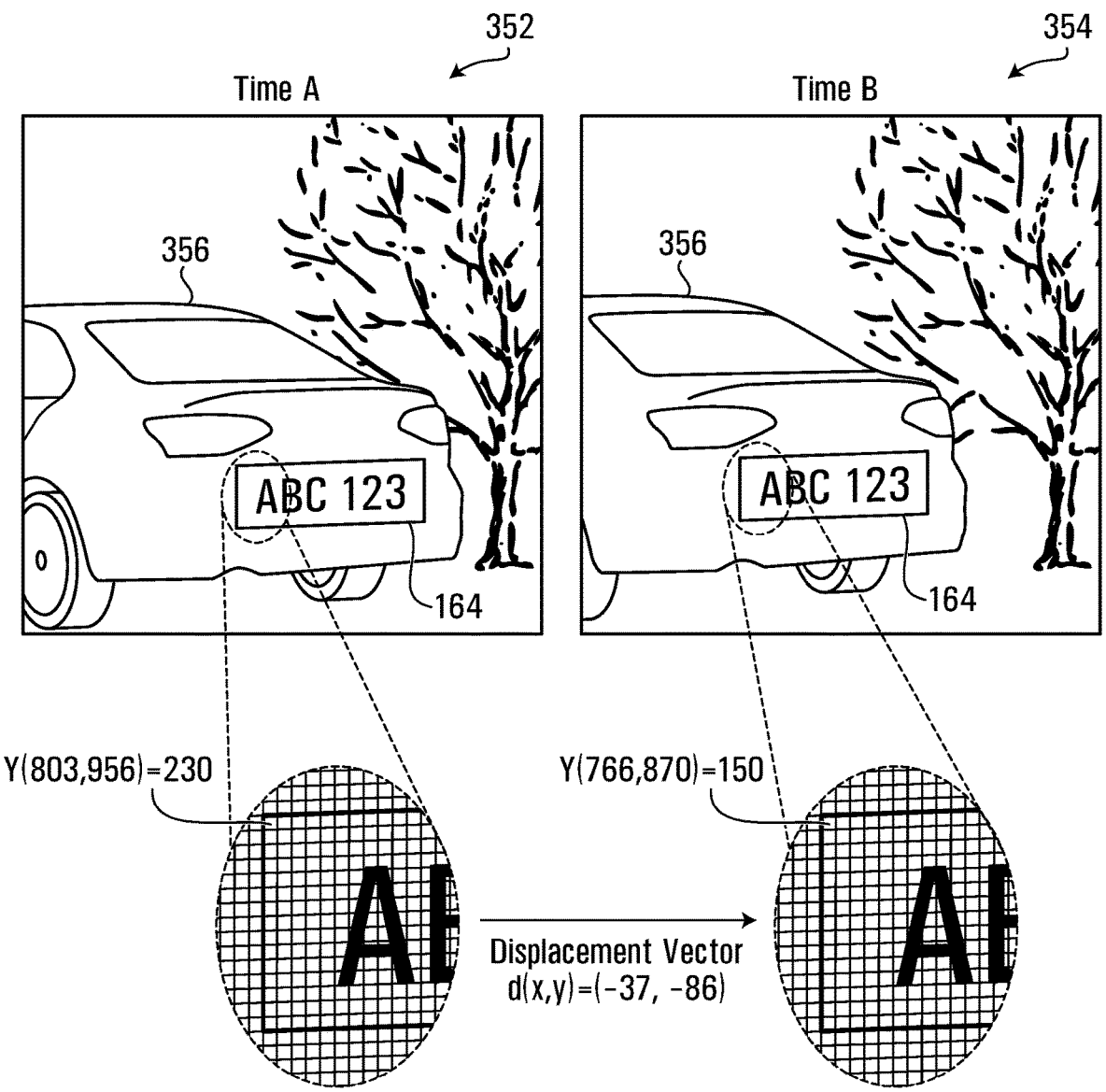
FIG. 12 illustrates two adjacent digital images, with movement of the content between the two images.

Content in the first and second images may be aligned before obtaining the compound image, e.g. to account for motion, such as the retroreflective object and/or the automatic recognition system moving between acquiring adjacent digital images. Motion between adjacent images may also happen as a result of relatively long camera exposition and/or camera vibration. If there is movement between acquiring adjacent digital images, then object position expressed in image pixel coordinates will be different in adjacent images. For example, FIG. 12 illustrates two adjacent digital images, a first image 352 acquired at time A, and a second image 354 acquired at time B. A vehicle 356 moves between time A and time B. The object 164 to be located is the license plate of the vehicle. The coordinate locations of the moving vehicle have been displaced in the second image 354 compared to the first image 352. In this example, the displacement is 37 pixel coordinates left and 86 pixel coordinates up. This displacement may be represented by a displacement vector d(x, y)=(−37, −86). For example, the pixel representing the top left corner of the license plate in the first image 352 is at coordinate value (803,956). That same corner of the license plate is at coordinate value (803−37,956−86)=(766,870) in the second image 356. To generate a more effective compound image from the first image 352 and the second image 354, the content of the two images may first be aligned before generating the compound image, e.g. by applying the displacement vector d to the first image 352 or applying the reverse of the displacement vector d to the second image 354. Other aligning techniques may be used instead, as described later. Note that only some of the content in the images may need to be aligned, e.g. if not all of the content moved between adjacent images. After alignment, the subtracting may then occur, e.g. as follows: for each pixel coordinate, subtracting the pixel value at that coordinate in the second image from the pixel value at that (aligned) coordinate in the first image to obtain a difference value, and then using the difference value as the pixel value at that coordinate in the compound image. For example, the top left corner of the license plate has a pixel value of '230' in the first image and a pixel value of '150' in the second image. The pixel value at the top left corner of the license plate in the compound image would therefore have a pixel value of 230−150=80. If the pixel value had multiple components, then each respective component would be subtracted. In some embodiments, the pixel value is set to zero if the subtraction results in a negative number.

Figure 13:
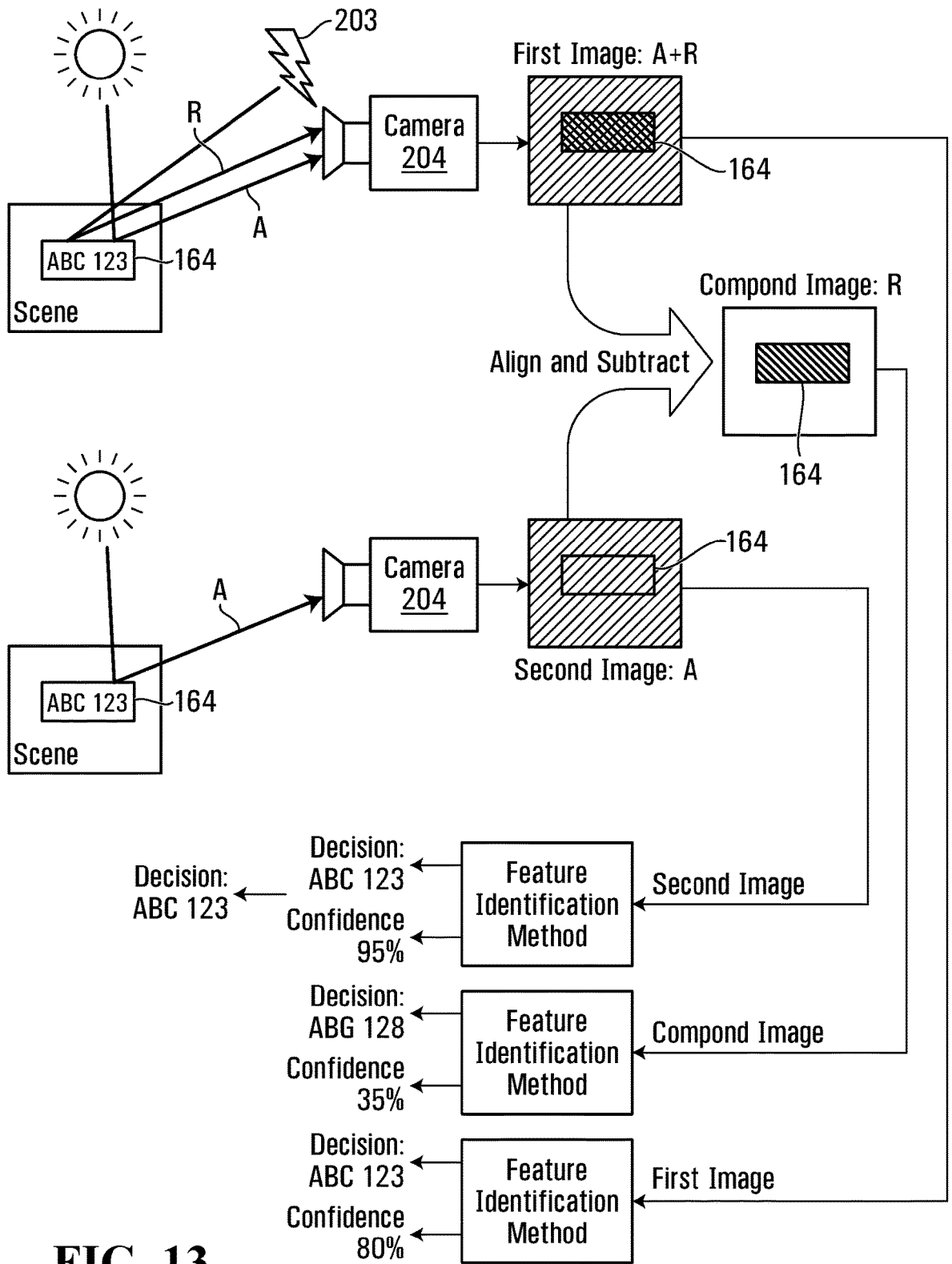
FIG. 13 illustrates the process of FIG. 10, supplemented to also perform feature identification.

After the object 164 is located in the compound image, the processor 208 may process the digital image of the object 164 in order to identify a feature of the object 164. For example, if the object 164 is a license plate, the processor 208 may attempt to identify the vehicle registration identifier (e.g. "ABC 123") written on the license plate. The processor 208 may use any one of the acquired images (first image, second image, or compound image) to try to identify the feature of the object 164. Depending on the environmental conditions, e.g. whether it is a sunny day or at night, and whether the retroreflective material 166 on the object 164 is damaged or soiled, then one of the acquired images may more clearly display the feature than the other. Therefore, in one embodiment, the processor 208 may perform feature identification on each one of the acquired images and output the result, along with a measure of confidence of the outputted result. The processor 208 may then select the identified feature associated with the highest confidence measure. For example, FIG. 13 illustrates the process of FIG. 10, supplemented to also perform feature identification, and where the feature to be identified is a vehicle registration identifier ABC 123. Each one of the first image, second image, and compound image are processed by the processor 208 to execute a feature identification method. The output of the method is a decision as to the identified feature, and an associated confidence score indicating the confidence of the decision. The confidence score is between 0% and 100%, where 0% indicates not confident at all that the identification is correct, and 100% indicates very confident that the identification is correct. The identified feature is selected as the instance of the identified feature that was identified with the highest confidence score. In the example in FIG. 13, the identified feature is most confidently identified from the second image, and so this is the identified feature selected.

As one example, consider operation of the automatic recognition system 162 on a sunny day and in a situation in which some of the retroreflective material 166 of the object 164 is damaged. Locating the object 164 in the compound image may be easier compared to locating the object in the first or second image, because the strong ambient light from the sun is reduced or eliminated in the compound image, which causes the object 164 to appear in the compound image as relatively more conspicuous (relatively more intense pixel values) than the surrounding scene. However, due to the damaged retroreflective material 166, the feature to be identified in the object may be more accurately identified in the second image because the second image includes only the ambient light. The second image does not include the retroreflected light, which may distort the portion of the object having the damaged retroreflective material.

Figure 14:
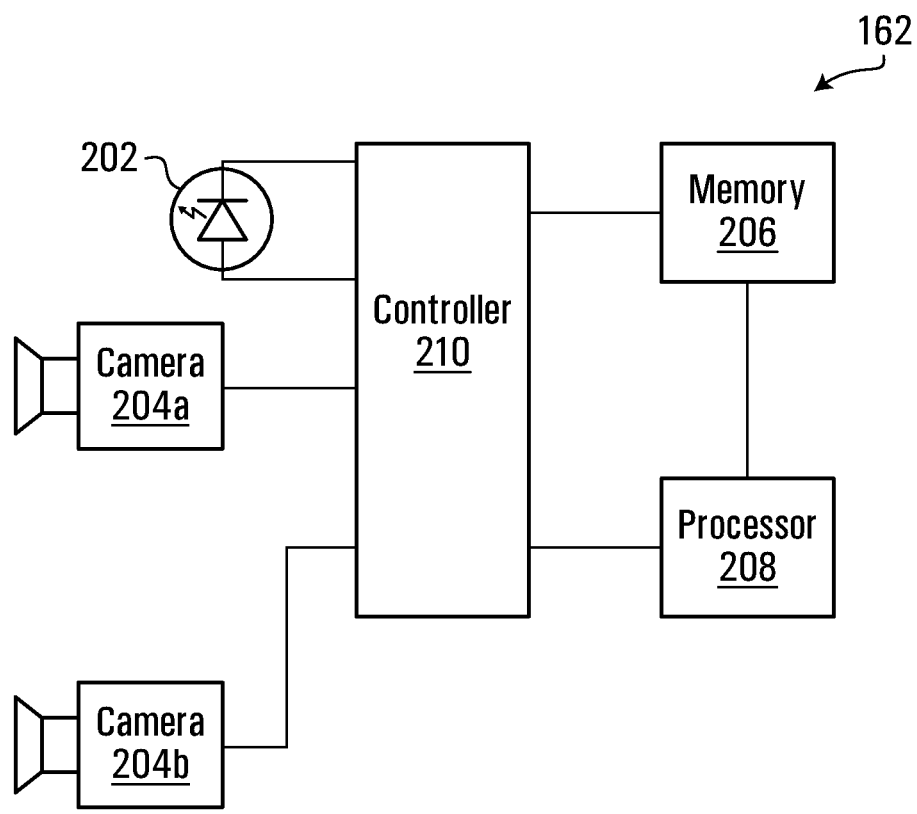
FIG. 14 illustrates a variation of the automatic recognition system in FIG. 4.

In embodiments described above, the same camera 204 takes successive digital images. Alternatively, there may multiple cameras, e.g. two cameras may be used: one to take images with light emitted from the illuminator 202, and the other one to take images without the light emitted from the illuminator 202. For example, FIG. 14 illustrates a variation of the automatic recognition system in FIG. 4 in which two digital cameras 204a and 204b are present. Digital camera 204a is associated with illuminator 202, and illuminator 202 acts as the flash for digital camera 204a. The illuminator 202 emits light when the digital camera 204a is to take a digital photograph. Digital camera 204b does not have an illuminator associated with it. Digital camera 204b takes a digital photograph using only ambient light. The controller 210 alternates which camera takes a digital photograph to generate a stream of acquired first and second images, i.e. one image with ambient and retroreflective light taken by digital camera 204a, followed by a next image with only ambient light taken by digital camera 204b, followed by a next image with ambient and retroreflective light taken by digital camera 204a, etc. Digital camera 204b may be located at a different location from digital camera 204a and illuminator 202. For example, a vehicle may pass underneath a platform. At one end of the platform digital camera 204a and illuminator 202 are present and take a first digital photograph of the vehicle to obtain a first image. At the other end of the platform digital camera 204b may be present and take a second digital photograph of the vehicle to obtain the second image.

When only one camera is used to take both the first and second images, e.g. as in FIG. 11 described earlier, then alignment of content in the first and second images may need to be performed before the compound image is generated. This is described above in relation to FIG. 12. Such content alignment is typically dynamic in nature in that the amount of alignment required will depend upon how much the content happened to move between acquiring the adjacent images. If there are two cameras, as in the FIG. 14 embodiment, then static content alignment typically needs to be performed because the first and second cameras are not in the exact same physical location and so capture the object at a different angle. The content alignment is static in that it typically does not change and can be computed in advance through a calibration step and always applied. However, dynamic content alignment may additionally be required if there is motion between acquiring the first image and the second image, e.g. if the first image is acquired by the first camera at a time different from the time at which the second image is acquired by the second camera. If the first and second images are instead acquired at the same time (e.g. if the second camera was situated to receive less of the light from the illuminator or if the second camera had a filter to filter out the light from the illuminator), then there would not by any dynamic content alignment and only static content alignment.

Figure 15:
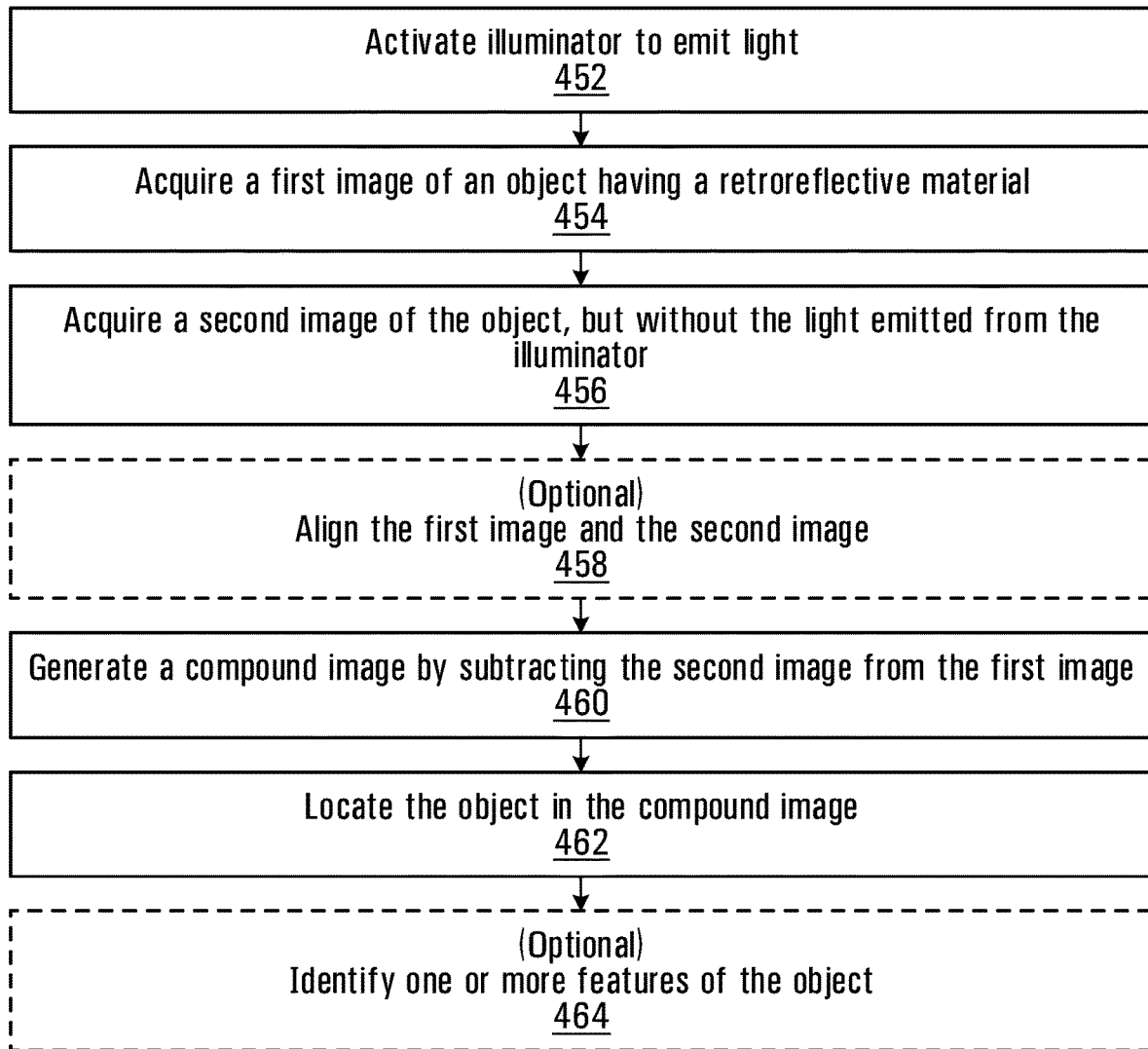
FIG. 15 is a flowchart of a method performed by the automatic recognition system, according to one embodiment.

FIG. 15 is a flowchart of a method performed by the automatic recognition system 162, according to one embodiment.

In step 452, the controller 210 activates the illuminator 202 to emit light. In step 454, the controller 210 activates an image acquisition device to acquire a first image of an object 164 having a retroreflective material 166. The first image is acquired with light emitted from the illuminator 202. Therefore, the first image includes both retroreflected light comprising light from illuminator 202 that has reflected off of the retroreflective material 166, as well as any ambient light that might be present.

In step 456, the controller 210 activates an image acquisition device to acquire a second image of the object 164. The second image is acquired without or with less of the light emitted from the illuminator 202. For example, the controller 210 may deactivate the illuminator 202 prior to acquiring the second image so that the illuminator 202 does not emit any light. As another example, a second image acquisition device may be used to capture the second image, and the second image acquisition device may be physically separated from the illuminator 202 in such a way that retroreflected light from the illuminator 202 is not captured in the second image. In yet another alternative embodiment, a shutter may be used so as to controllably block and admit light from the illuminator.

The terms "first image" and "second image" as used herein are labels to distinguish between two different images. The order in which the images are acquired is not implied. For example, in some embodiments, step 456 may be performed before steps 452 and 454.

In step 458, the processor 208 aligns content in the first and second images. It should be appreciated that step 458 may result in no change to either image in cases where, e.g. there is no movement of the object or of the automatic recognition system 162 between acquiring the first image and the second image, such that the first image and the second image have substantially the same content in substantially the same location in both images. In some embodiments, step 458 may be optional.

In step 460, the processor 208 generates a compound image by subtracting the second image from the first image. As described above, the first and second images may first need to be aligned.

In step 462, the processor 208 then searches for the object in the compound image in order to locate the object in the compound image. The exact procedure implemented by the processor 208 to locate the object in the compound image is implementation specific and may depend upon the object actually being located (e.g. a license plate versus a traffic sign versus an obstruction having a retroreflective surface, etc.). However, in general the object in the compound image will have pixels that have a higher intensity compared to the pixels in the surrounding scene of the compound image. This is because the ambient light has been reduced or eliminated in the compound image, and the retroreflective light still present in the compound image will largely comprise light reflected directly back from the object 164, rather than from other non-retroreflective items in the scene that scatter the light from illuminator 202. Therefore, the procedure for locating the object may rely, at least in part, upon identifying pixels having a higher intensity compared to other pixel. For the sake of completeness, an example method for searching for an object in a digital image to locate the object (where the object is a license plate) is disclosed in Zheng, D., Zhao, Y. and Wang, J., 2005. "An efficient method of license plate location", *Pattern recognition letters*, 26(15), pp. 2431-2438. Another example method is disclosed in Anagnostopoulos, C. N. E., Anagnostopoulos, I. E., Loumos, V. and Kayafas, E., 2006, "A license plate-recognition algorithm for intelligent transportation system applications", *IEEE Transactions on Intelligent transportation systems,* 7(3), pp. 377-392.

Optionally, in step 464, the processor 208 uses at least one of the first image, the second image, and the compound image to identify one or more features of the object. For example, as explained above in relation to FIG. 13, a feature identification method may be implemented that accepts as an input a digital image of the object and returns as an output a feature identified from the object, as well as a confidence score associated with the identified feature. The feature identification method may be executed on the first image to obtain a first instance of the identified feature, and on the second image to obtain a second instance of the identified feature, and on the compound image to obtain a third instance of the identified feature, and the instance of the identified feature having the highest confidence score may be used as the selected identified feature. The feature identification method itself is implementation specific and may be dependent upon what is actually being identified, e.g. reading a license plate, versus reading a traffic sign, versus determining whether the object is an obstruction, etc. As one example, the feature identification method may comprise optical character recognition (OCR) to make a decision as to what is printed on the object. One example feature identification method that may be used is disclosed in Anagnostopoulos, C. N. E., Anagnostopoulos, I. E., Loumos, V. and Kayafas, E., 2006, "A license plate-recognition algorithm for intelligent transportation system applications", *IEEE Ttransactions on Intelligent transportation systems,* 7(3), pp. 377-392.

Step 464 is optional because in some applications it may not be necessary to identify a feature in an object having a retroreflective material. For example, if the object is an obstruction having a retroreflective surface, just identifying the location of the obstruction may be all that is needed.

In some embodiments, the components of the automatic recognition system 162 may be distributed. For example, the processor 208 may be remote from the one or more digital cameras, e.g. the processor 208 may be in the cloud and receive the digital images from the one or more digital cameras over a network.

As discussed above, it may be necessary to align content in the the first image (illuminator on) with content in the second image (illuminator off) before generating the compound image. The following describes one specific example method for aligning content of the first and second images. It will be appreciated that other methods of aligning content in the first and second images may be used instead.

Figure 16:
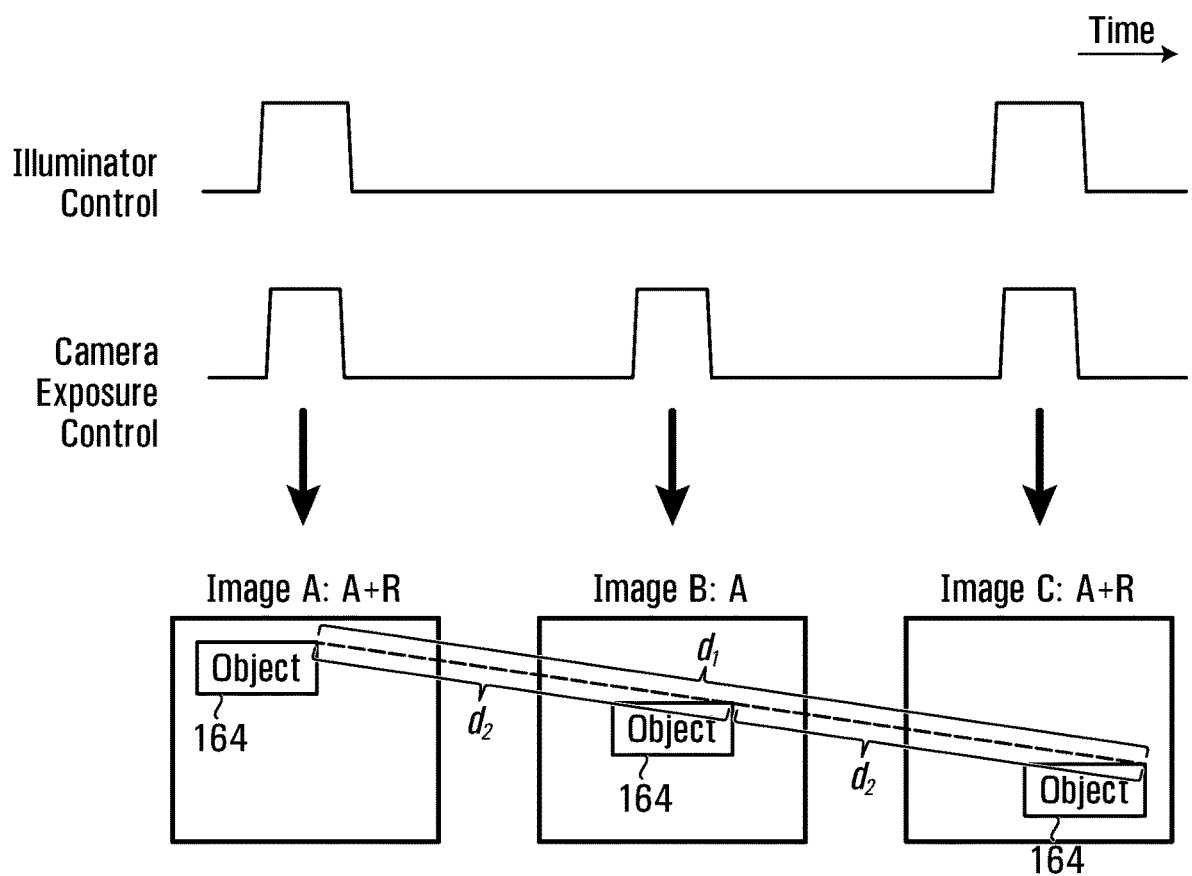
FIG. 16 illustrates three images, showing displacement of an object over time.

The example method described below operates as follows. Three adjacent images are acquired: image A is first acquired with light emitted from the illuminator 202, such that image A includes both ambient light and retroreflective light (A+R); image B is then acquired without the light emitted from illuminator 202, such that image B includes only ambient light (A). Image C is then acquired with light emitted from the illuminator 202, such that image C includes both ambient light and retroreflective light (A+R). The retroreflective object 164 moves between acquiring images A, B, and C, and therefore the object 164 is displaced by a displacement vector between each of the images. FIG. 16 illustrates the three images A, B, and C, showing displacement of the object 164 over time. The displacement is exaggerated for purposes of illustration. In actual implementation there might not be much movement between adjacent digital images, e.g. if the adjacent digital images are acquired in quick succession. As shown in FIG. 16, the top right corner of object 164 is displaced by displacement vector $d_1$ between images A and C. The displacement between image B and image A or between image B and image C is assumed to be vector $d_2$, computed by dividing displacement vector $d_1$ by two. Displacement vector $d_2$ is computed as half the displacement of vector $d_1$ on the assumption that the acquisition time of an image captured with the illuminator 202 off is halfway between the acquisition times of neighboring images acquired with the illuminator 202 on, and that the motion is generally constant between the two images captured with the illuminator 202 on. Therefore, the displacement between content in image B and content in one of the neighbor images A or C is half the displacement between content in images A and C. In other embodiments, the displacement between content in image B and content in one of the neighbor images A or C may not be half the displacement between content in images A and C, but more generally may be proportional to (or a function of) the displacement between content in images A and C, e.g. $d_2 = k \times d_1$, where $0 < k < 1$, and k is not necessarily 0.5. For example, if the time between images A-B and images B-C is not equal, the displacement vector $d_2$ may be calculated as the vector $d_1$ multiplied by time between images A-B and divided by the time between images A-C. Also, different sections of the images may require different displacement vectors. For example, between image A and image C some content may move (e.g. the vehicle) and other content may not move (e.g. the background).

Image A or image C is used as the 'first image' (illuminator on) in the method of FIG. 15. Image B is used as the 'second image' (illuminator off) in FIG. 15. The second image is subtracted from the first image to result in the compound image, but before the subtraction takes place the content of the first image and the second image are aligned by shifting the content of the second image (image B) by displacement vector $d_2$ to align with the content of the first image (image A or image C). The opposite is also possible, i.e. shifting the content of the first image to align with the content of the second image.

Figure 17:
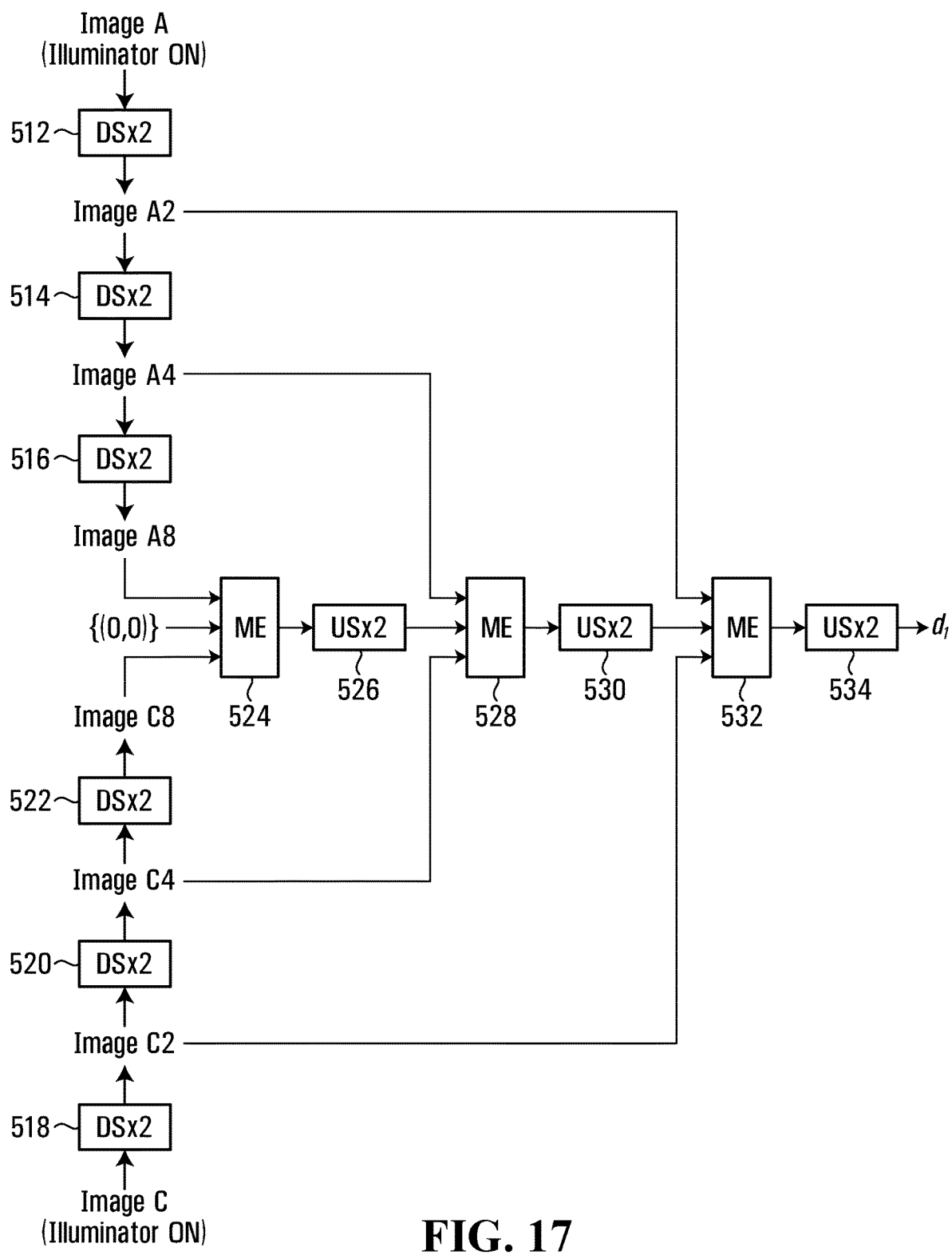
FIG. 17 is a flow chart illustration showing how displacement vector $d_1$ may be obtained.

To obtain displacement vector $d_2$ from displacement vector $d_1$, it is first necessary to obtain displacement vector $d_1$. One example way to determine displacement vector $d_1$ is explained with reference to FIG. 17. FIG. 17 is a flow chart illustration showing how displacement vector $d_1$ may be obtained from images A and C. Each block in FIG. 17 labelled DS×2 refers to a downsampler that downsamples an input image by a factor of 2. Each block labelled US×2 refers to an upsampler that upsamples and multiplies a vector by a factor of 2. Each block labelled ME refers to a motion estimator that executes a motion estimation algorithm. Before further describing FIG. 17, the motion estimation algorithm implemented by a ME will first be explained.

Figure 18:
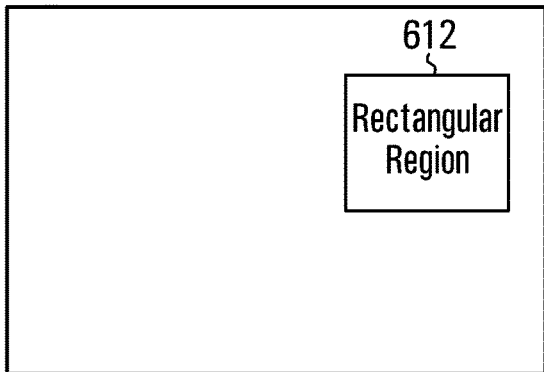
FIG. 18 illustrates steps performed by a motion estimation algorithm.
Figure 18:
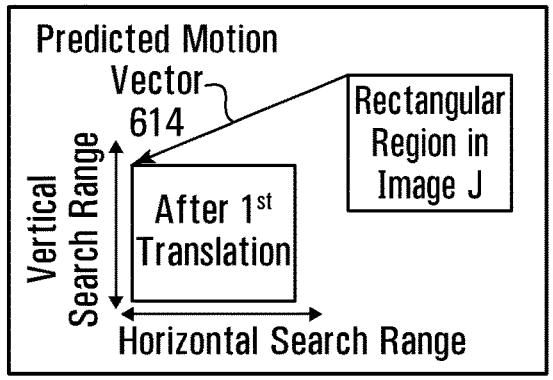
Figure 18:
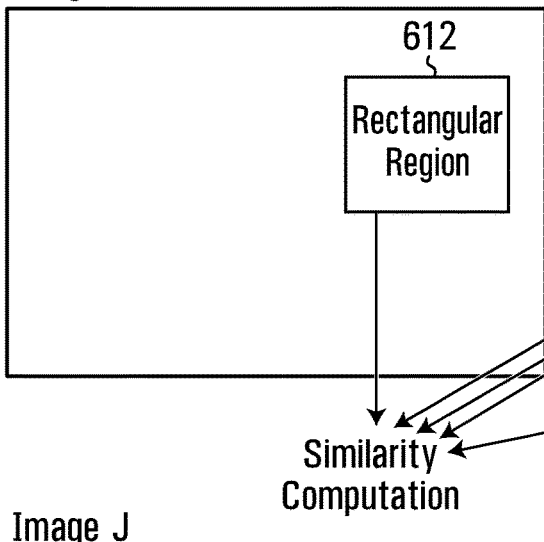
Figure 18:
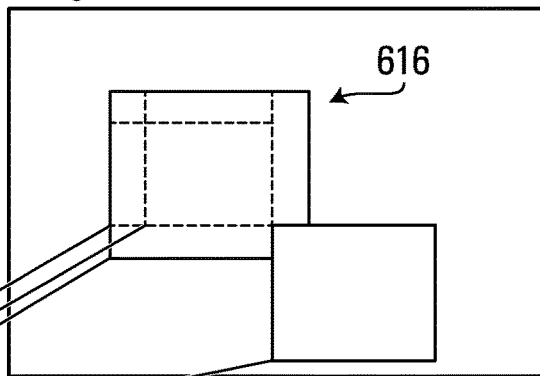
Figure 18:
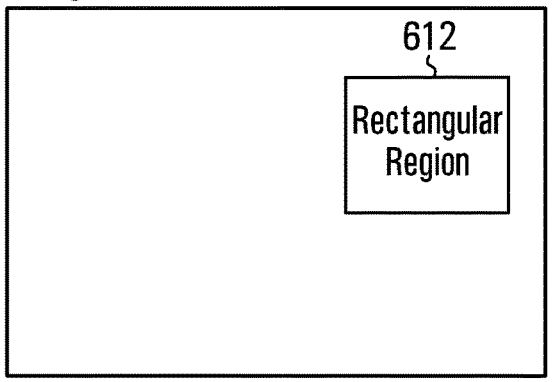
Figure 18:
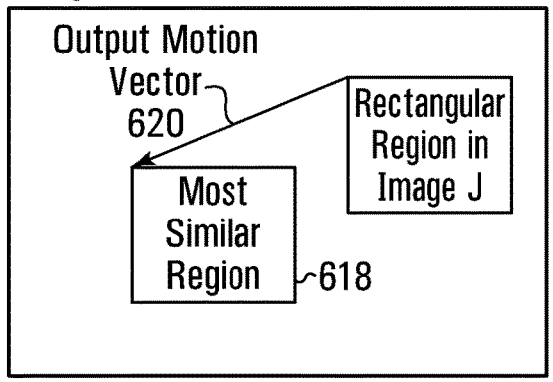

Two images J and K, and a set of predicted motion vectors are input into the motion estimator ME. Each predicted motion vector of the set of predicted motion vectors corresponds to a respective rectangular region in image J and K, and predicts the displacement of the content from image J to image K in that respective rectangular region. For example, the image J may be partitioned into 16×16=256 rectangular regions. For each rectangular region of J, steps 1 to 3 are performed below, which are illustrated in FIG. 18.

Step 1: Form a set of rectangular areas in image K by translating the position of the rectangular region in image J by the predicted motion vector corresponding to that region, and by further translating the rectangular region with all the possible translations in a search range, i.e. all translations of an integer number of pixels in the horizontal and vertical directions, e.g. with range of ±16 pixels horizontally and ±12 pixels vertically. With reference to FIG. 18, rectangular region 612 in image J has its position translated in image K by the predicted motion vector 614, and the region is further translated in the horizontal and vertical directions to form a set of rectangular areas 616 in image K.

Step 2: Compare the pixels of the rectangular region of image J to the pixels in each rectangular area in image K. Select the rectangular area in image K that has the pixels the most similar to pixels in the rectangular region in image J. In this example, the similarity measure used is the sum of absolute difference of the pixels. With reference to FIG. 18, each rectangular area in the set of areas 616 in image K has its pixels compared to the rectangular region of image J, and a rectangular area 618 in image K is selected that has pixels the most similar to the pixels in the rectangular region 612 in image J.

Step 3: Output a motion vector for the rectangular region as the displacement between the rectangular region of image J and the selected rectangular area in image K. This is motion vector 620 in FIG. 18.

When steps 1 to 3 are repeated for each rectangular region of J, the result is a set of output motion vectors, each one corresponding to a respective rectangular region in image J and K.

Further detail describing one possible implementation of the motion estimation algorithm may be found in the publication "Intro to Motion Estimation Extension for OpenCL*" by Maxim Shevtsov, published by Intel Corporation in 2013.

Returning back to FIG. 17, image A is downsampled by a factor of two using downsampler 512 to result in image A2. Image A2 is downsampled by a factor of two using downsampler 514 to result in image A4. Image A4 is downsampled by a factor of two using downsampler 516 to result in image A8. Therefore, image A4 is downsampled by a factor of four compared to image A, and image A8 is downsampled by a factor of eight compared to image A. Similarly, image C is downsampled by a factor of two using downsampler 518 to result in image C2, image C2 is downsampled by a factor of two using downsampler 520 to result in image C4, and image C4 is downsampled by a factor of two using downsampler 522 to result in image C8.

Images A8 and C8 are input into motion estimator 524, along with a set of predicted motion vectors each having a value (0,0), i.e. no predicted displacement. The set of output motion vectors from motion estimator 524 are upsampled and multiplied by two via upsampler 526, and then input as the predicted motion vectors into motion estimator 528, along with images A4 and C4. The set of output motion vectors from motion estimator 528 are upsampled and multiplied by two via upsampler 530, and then input as the predicted motion vectors into motion estimator 532, along with images A2 and C2. The set of output motion vectors from motion estimator 532 are upsampled and multiplied by two via upsampler 534. The output of upsampler 534 is displacement vector $d_1$ in the form of a set of displacement vectors, each displacement vector in the set corresponding to a respective rectangular region in images A and C.

The displacement vector $d_1$ may then have its magnitude divided in half to obtain displacement vector $d_2$.

Image A or image C may be selected as the 'first image' in the method of FIG. 15, i.e. the image taken with light from the illuminator. Image B may be selected as the 'second image' in the method of FIG. 15, i.e. the image taken without the light from the illuminator. Before subtracting the first and second images, the content in image B is aligned with the content in selected image A or C by applying displacement vector $d_2$ to image B. Specifically, the subtraction with alignment may occur as follows: the pixel value (intensity) of each pixel of the compound image is the difference between (1) the pixel value (intensity) of the pixel of image A (or image C) at the same position as the pixel in the compound image and (2) the pixel value (intensity) of the pixel of image B at the position of the pixel in the compound image translated by the displacement vector $d_2$. For the pixels where the translation of position leads to a position outside the images, the compound image pixel value is set to 0.

In some embodiments, optional step 464 of FIG. 15 may be performed, i.e. one or more features of the object may be identified. As discussed above, at least one of the first image (image A or C), the second image (image B), and the compound image may be used. The position of the object in each image needs to be known. Continuing the example described above in relation to FIGS. 16-18, the position of the object 164 in image A or C is the same position as the object 164 in the compound image. The position of the object 164 in image B is the position of the object in the compound image translated by the displacement vector $d_2$.

Figure 19:
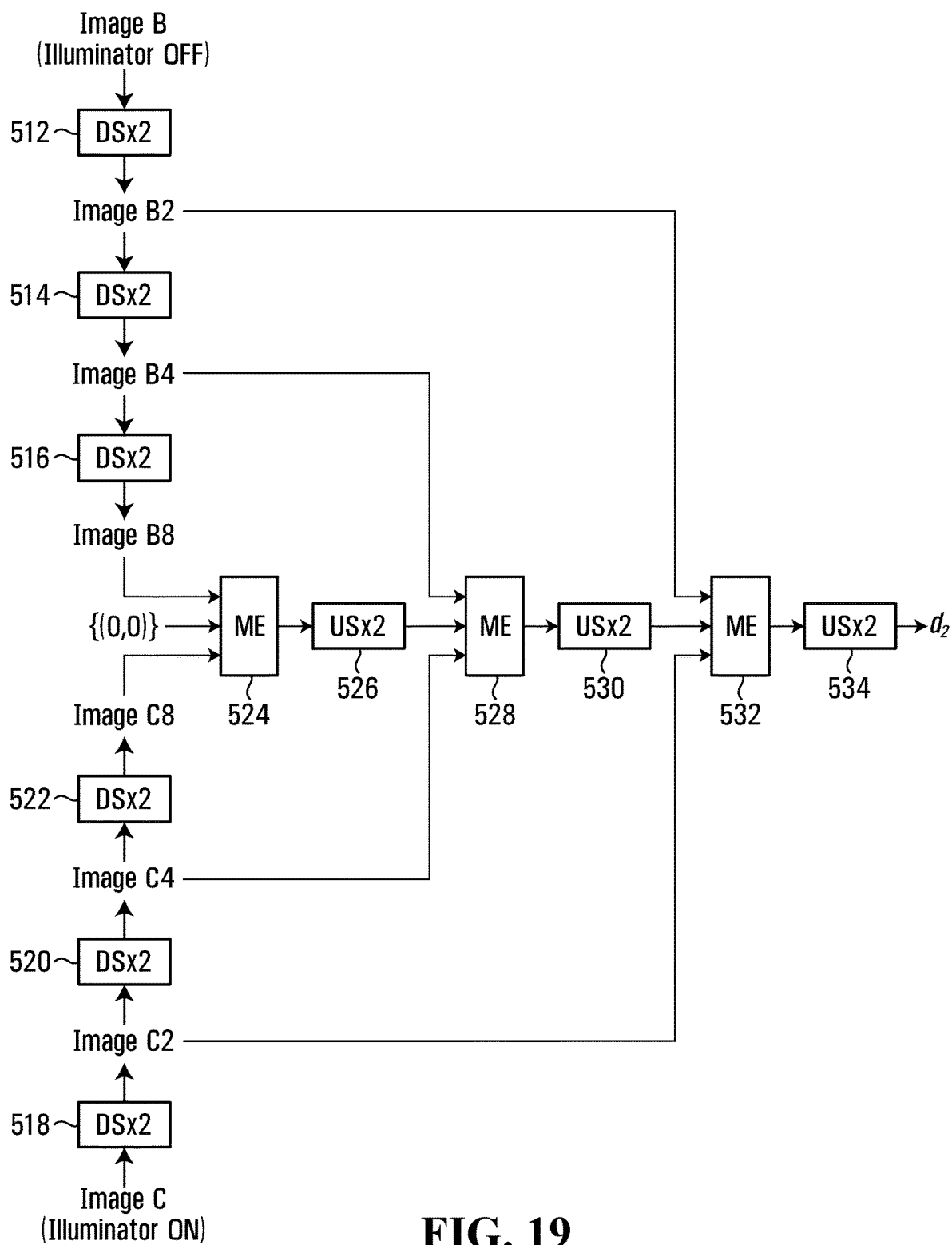
FIG. 19 is a flow chart illustration showing how displacement vector $d_2$ may be obtained.

In the example described above in relation to FIGS. 16-18, the displacement vector $d_2$ is determined by using two images with illuminator 202 on (images A and C) to determine displacement vector $d_1$, and then obtaining displacement vector $d_2$ from displacement vector $d_1$. Alternatively, Image A and image B (or image C and image B) may be used to determine displacement vector $d_2$ directly by using the method of FIG. 17, but modified to replace image A or image C with image B. For example, FIG. 19 is a variation of FIG. 17 in which image A is replaced with image B, and the output is therefore instead displacement vector $d_2$.

Figure 20:
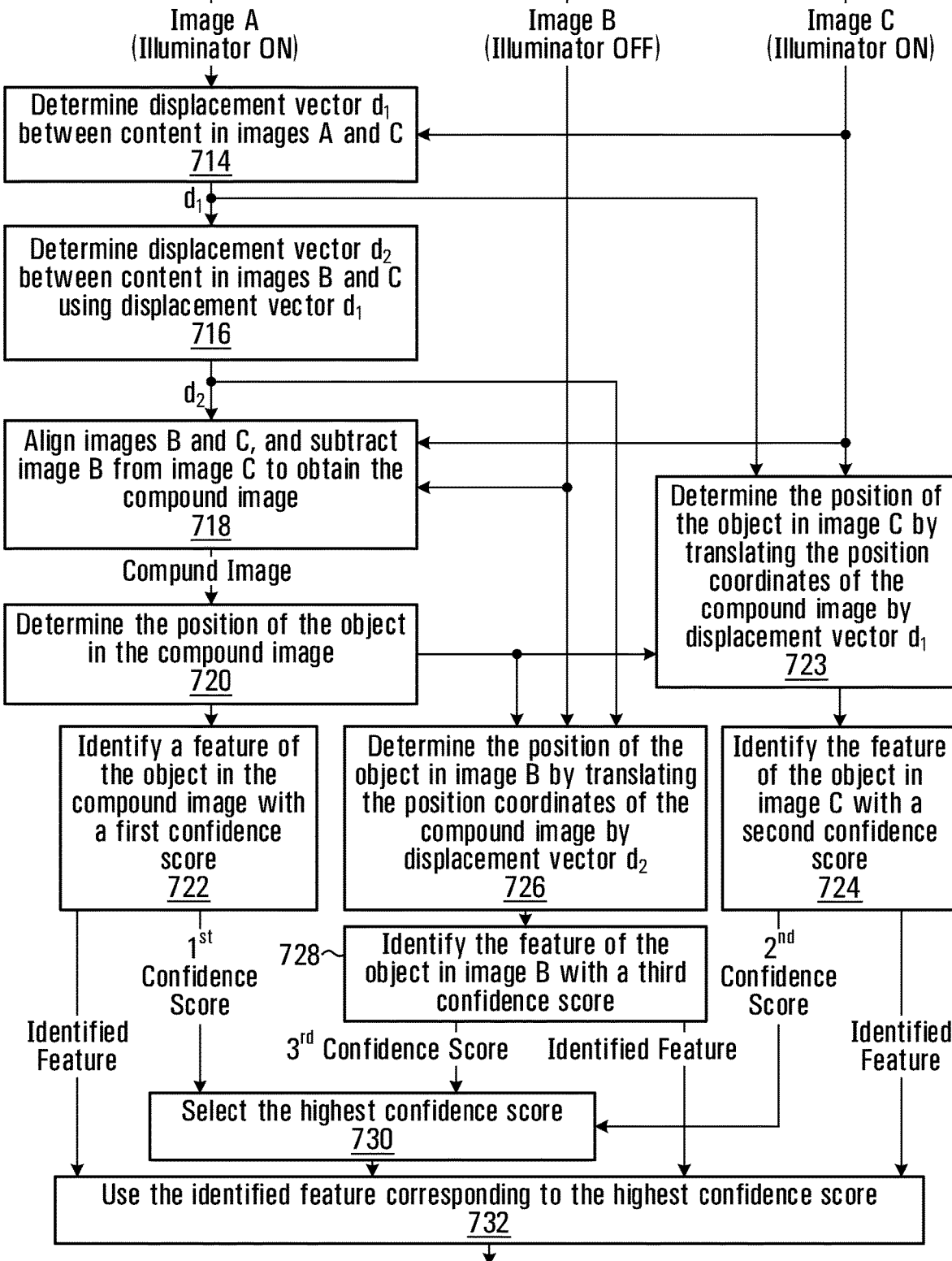
FIG. 20 is a flowchart of a method performed by an automatic recognition system, according to another embodiment.

FIG. 20 is a flowchart of a method performed by automatic recognition system 162, according to another embodiment. In step 712, a plurality of images are acquired in succession, including image A ("illuminator ON"), image B ("illuminator OFF"), and image C ("illuminator ON"). In step 714, the displacement vector $d_1$ between content in images A and C is determined using the method described above in relation to FIGS. 16-18. In step 716, the displacement vector $d_2$ between content in images B and C is determined by dividing the displacement vector $d_1$ in half. In step 718, image B (aligned by displacement vector $d_2$) is subtracted from image C to obtain the compound image. In step 720, the position of the object 164 in the compound image is identified. In step 722, a feature of the object is identified in the compound image with a first confidence score. In step 723, the position of the object in image C is determined by translating the coordinate positions of the object in the compound image by the displacement vector $d_1$. In step 724, the feature of the object is then also identified in image C with a second confidence score. In step 726, the position of the object in image B is determined by translating the coordinate positions of the object in the compound image by the displacement vector $d_2$. In step 728, the feature of the object is then also identified in image B with a third confidence score. Steps 722, 723/724, and 726/728 may be performed in parallel, as illustrated. In step 730, the highest confidence score is selected. In step 732, the identified feature corresponding to the highest confidence score is selected as the identified feature to use for further processing. In some embodiments, the object may be a license plate, and the identified feature may be the symbols making up the vehicle registration identifier.

Many variations of the embodiments described above are possible. Some example variations are described below.

As mentioned earlier, the image captured with the illuminator on and the image captured with the illuminator off may be acquired by two different cameras. However, in some embodiments, the exposures of these cameras may be translated slightly in time, just enough to have the illuminator turned on for one exposure and turned off for the other exposure. This may allow the alignment of the scene between the two images to be constant because the displacement of the scene or the displacement of the automatic recognition system would be negligible. This may remove the need to dynamically determine the displacement of content from one image to the other during operation. However, it may require a calibration step in which the constant displacement is determined between the scene in the images captured by the two cameras.

Figure 21:
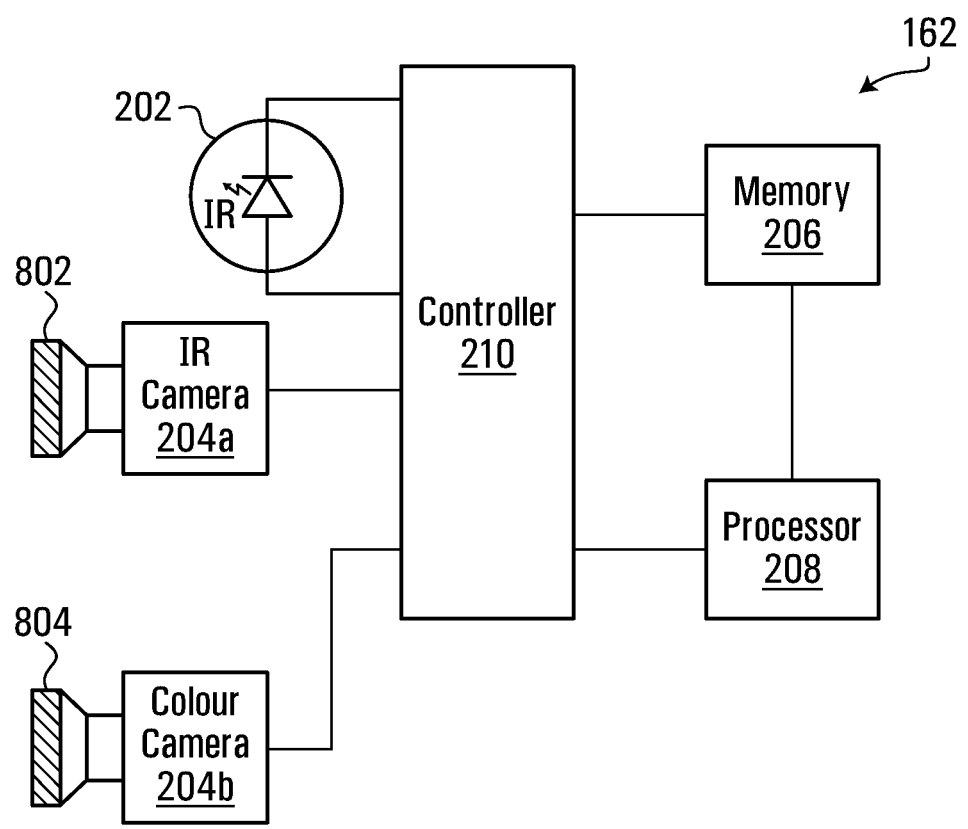
FIG. 21 is a variation of FIG. 14 in which the two cameras are of different types.

In embodiments above, the second image is acquired without or with less of the light from the illuminator. This may be achieved in different ways, e.g. by alternating the illuminator on and off (as in FIG. 11), or by using a second camera that is physically spaced from the illuminator (as in FIG. 14). Other embodiments that utilize two cameras are as follows. In some embodiments a first camera is associated with an illuminator flash and a second camera is not associated with an illuminator flash, e.g. as in FIG. 14. The first camera acquires the first image (with the flash) at the same time as the second camera acquires the second image. The second camera may be physically separated from the first camera so that the second camera captures less of the light of the flash compared to the first camera. Alternatively, the second camera may have a filter that filters out the light of the flash. In other embodiments, the second camera may acquire the second image after the first camera acquires the first image and after the flash is turned off, in which case the second camera typically would not need a filter to filter out light of the flash and would not need to be physically separated from the first camera. In some embodiments, the first camera and the second camera may be of different types, e.g. one an infrared camera and the other a colour camera. For example, FIG. 21 is a variation of FIG. 14 in which the illuminator 202 emits infrared light, the camera 204a is an infrared camera used to acquire the first image, and the camera 204b is a colour camera used to acquire the second image. Camera 204a has an optical filter 802 for filtering out visible light, and camera 204b has an optical filter 804 for filtering out infrared light. The controller 210 controls camera 204a and 204b to expose at the same time so that the first image and the second image are acquired at the same time, which may make content alignment between the two images easier because only static content alignment is needed. The optical filter 804 on camera 204b filters out the infrared light from the illuminator 202 to try to emulate the act of acquiring the second image without the flash. Alternatively, the controller 210 may alternate which camera takes a digital photograph to generate a stream of acquired first and second images, i.e. one image with ambient and retroreflective light taken by digital camera 204a, followed by a next image with only ambient light taken by digital camera 204b, followed by a next image with ambient and retroreflective light taken by digital camera 204a, etc. In this case, the filter 802 and/or the filter 804 may not be needed, but dynamic content alignment may be required because the first and second images are not being acquired at the same time. In any case, when one camera is an infrared camera and the other camera is a colour camera, then the subtraction operation is modified to take into account the different pixel intensities. For example, ambient light captured by the infrared camera will have a pixel value with an intensity that is different from the same ambient light captured by the luminance (Y) component of the pixel value in the colour camera. Subtraction between the intensity of the 'illuminated' camera (possibly infrared) and the luminance component of the 'non-illuminated' camera (possibly colour) will not result in zero, and so a value C must be determined and used to try to equalize the components, e.g. by being used as follows: Camera1(Ambient+Retroreflected)−C×Camera2(Ambient). The value of C may be determined by processor 208 and updated periodically during operation, e.g. when the processor 208 has CPU down time. One method to determine C is to perform the following iterative procedure:

Step 1: Set C=1.
Step 2: Align content of first and second images, as necessary.
Step 3: Calculate the compounded image as per Camera1 (Ambient+Retroreflected)−C×Camera2(Ambient).
Step 4: Evaluate the average value of the 10% least illuminated pixels.
Step 5: If the average is negative, reduce C by a determined percentage that is proportional to the average, and recalculate from Step 3.
Step 6: If the average is positive and higher than a determined value, increase C by a determined percentage that is proportional to the average, and recalculate from Step 3.
Step 7: If the average is positive and lower than a determined value, exit the algorithm. Take the value of C as output to be used in the subtraction operation when subtracting the second image from the first image.

A periodic or always running algorithm, such as that above, can calculate and maintain the value C so that the result of the subtraction where the image is exposed by the ambient light is as low as possible without being negative. Note that the algorithm may not need to be executed once per incoming pair of images, because the value C is not expected to change very fast. In general, C may only change if the lighting conditions change.

During operation, the processor calculates the compound image in the same way described earlier, but incorporating value C, e.g.: obtain non-illuminated image B, align it with image A using dynamic displacement and/or constant (static) displacement as needed, and then subtract both images using the modified subtraction Pixel(Image A)−{C×Displaced Pixel(Image B)}.

Other variations are described below.

In some embodiments, if there is no (or very small) motion of scene or of the automatic recognition system, then finding the alignment between the scenes in images may result in no change to any of the images. In some embodiments, the alignment step may be omitted, even if there is some motion between adjacent images, because the reduction in complexity from omitting the alignment step may outweigh the reduced accuracy.

In some embodiments, the automatic recognition system may further comprise an auto-exposure algorithm to determine an appropriate exposure level (gain, exposure time, iris) that is best suited to produce a compound image with good contrast in the retroreflective object (e.g. with good contrast in the license plate).

In some embodiments, the automatic recognition system may be configured to disable the method described herein if the ambient light is small enough that it does not impede object localization. For example, at night when there is little to no ambient light, the system may be configured to just take a digital photograph with the illuminator on, and locate the retroreflective object using just that image. Subtracting an image with the illuminator off from an image with the illuminator on (i.e. FIG. 15 above) is not utilized because there is little ambient light present. That is, when operating in this mode, only images captured with illuminator on are analyzed for object localization and feature identification (e.g. for license plate localization and plate reading), with no scene alignment or image subtraction. The apparatuses/methods described herein may be enabled only if the external illumination (e.g. sunlight) is powerful enough. In one implementation, a sensor (not illustrated) is used to measure the amount of ambient light present in the outside environment. When the measured amount of ambient light is below a threshold (e.g. when it is dark outside), then the image subtraction method described above is disabled and the system instead just takes a digital photograph with the illuminator on, and locates the retroreflective object using just that image.

In some embodiments, the automatic recognition system may further comprise an extra illuminator located far from the camera, and that would provide ambient light to result in an image that is not completely dark when the main illuminator is off, even if there is no sunlight.

In some embodiments, the automatic recognition system may further comprise an apparatus/method to compensate for different exposure levels (exposure time, gain, iris) between images. This compensation may occur before or during scene alignment or image subtraction.

Many variants can be implemented to align the content in various images, e.g.: one or more of the following variants: different algorithms could be used, in particular the automatic recognition system could detect keypoints, extract descriptors from them, and match these descriptors; or the automatic recognition system could use optical flow for content alignment; the image captured with illuminator on and the image captured with illuminator off may be directly aligned together without relying on the alignment between only images captured with the illuminator on; the displacement vectors may be processed by local filtering to remove outliers, to favor displacements that are smooth; the motion vectors computed in previous images may be used to help the computation of motion vectors; the motion vectors directions may be found from a mean of motion vector directions in previous images; the motion vectors directions may be forced to be in accordance with a perspective motion field; the motion vectors directions may be determined according to the displacement of the automatic recognition system, e.g. if it is known by some means (e.g, by accelerometers, GPS, etc.); the images may be subsampled by other factors than described; the translation range may be different than described; the similarity measure between pixels in two rectangular regions may be different than described.

In embodiments described above, the compound image is generated by subtracting the second image from the first image, i.e. a subtraction operation. However, more generally the compound image may be generated from or using the first image and the second image, e.g. by combining the first image and the second image, and not necessarily subtraction. For example, an artificial intelligence method, such as a machine learning algorithm, may be used. Also, more generally, in some embodiments a compound image may not even be generated. Rather, the first and second images may be processed to locate the object, e.g. via an artificial intelligence method, such as by a machine learning algorithm. For example, in some embodiments, instead of using the compound image to locate the object, the algorithm implemented by the processor for object location may receive in parallel the image captured with the illuminator on and an aligned image obtained from the image captured with the illuminator off. The pixel intensities of these two images could then be combined to locate the object. In some embodiments, a compound image may be generated that, instead of being the subtraction of the two images, is the "channel concatenation" of the two images. A channel of an image refers to a component of an image, e.g. one colour or luminance component of the image. A colour image may have three channels, e.g. a red channel, blue channel, and green channel, where the red channel is a grayscale image of the same size as the original colour image but only representing the red component of each pixel, where the blue channel is a grayscale image of the same size as the original colour image but only representing the blue component, and where the green channel is a grayscale image of the same size as the original colour image but only representing the green component. A monochromatic image only has one channel. The channel concatenation of two images refers to concatenating the channels of each image. Channel concatenation involves creating a data structure that is a 2D set of pixels (an image), but where each pixel has information about all of the channels of the original images. For example, if the first image had pixel value $R_1(x, y)$ at pixel coordinate (x, y) of its red channel, if the second image had pixel value $R_2(x, y)$ at corresponding pixel coordinate (x, y) of its red channel, if the first image had pixel value $B_1(x, y)$ at pixel coordinate (x, y) of its blue channel, if the second image had pixel value $B_2(x, y)$ at corresponding pixel coordinate (x, y) of its blue channel, if the first image had pixel value $G_1(x, y)$ at pixel coordinate (x, y) of its green channel, and if the second image had pixel value $G_2(x, y)$ at corresponding pixel coordinate (x, y) of its green channel, then the channel concatenation of the two images is $[R_1(x, y), R_2(x, y), B_1(x, y), B_2(x, y), G_1(x, y), G_2(x, y)]$ at pixel coordinate (x, y). In one embodiment, two monochrome images (the first image and the second image) may be taken, and combined to form a compound image that has two channels (one corresponding to the first image and one corresponding to the second image). In another embodiment, two red-green-blue images (the first image and the second image) may be taken and combined to form a compound image that has six channels (one channel for each red, green, blue component for each image). Some embodiments may use deep learning for object detection. A deep learning algorithm may accept images with any number of channels as input images. The deep learning may use training to automatically find intermediate "features" that can be based on the difference between pixels of different channels. For example, in some embodiments, a compound image may be generated that is the channel concatenation of the two images (illuminator on and illuminator off), followed by a deep learning feature identification algorithm that can automatically take advantage of all of the information from all of the channels, possibly including subtraction of the pixel values of the different channels.

In some embodiments, the automatic recognition system may better align the image regions of the retroreflective object after the retroreflective object has been localized, but before identifying a feature in the retroreflective object. For example, the automatic recognition system may better align the image regions of a license plate after the license plate has been localized, but before the license plate is read. This alignment may be a global alignment of the license plate regions.

In some embodiments, instead of identifying a feature of the retroreflective object separately in the image captured with illuminator on, in the image captured with illuminator off, and in the compound image (e.g. instead of steps 722 to 732 of FIG. 20), the processor may instead execute an algorithm that takes all these images together as input. The pixel intensities of all images could be combined in various ways to identify the feature.

In some embodiments, a plurality of retroreflective objects may be located in an image (e.g. in the compound image described above), and instead of identifying a feature in one of the objects, a feature may be identified based on the pattern, location, and/or arrangement of the objects. For example, each retroreflective object may be a character. The characters may be individually located in the image, and the combination of characters is read.

FIG. 22 is a flowchart of a method performed by an automatic recognition system, according to another embodiment. In step 952, a plurality of digital images are obtained. For example, the plurality of digital images may be read from memory after having been acquired by at least one image acquisition device. The plurality of digital images includes a first image that was acquired with light emitted from an illuminator, and a second image that was acquired without or with less of the light emitted from the illuminator. At least one image acquisition device may be used to acquire the plurality of digital images in the different ways explained earlier.

In step 954, the first image and the second image are processed to search for an object in order to locate the object. The processing may be of any type, e.g. an artificial intelligence algorithm, subtraction of images, etc. In some embodiments, the processing includes generating at least one compound image from the first image and the second image. The compound image may then be used to search for the object to locate the object. In some embodiments, generating the compound image includes combining the first and second images, e.g. by subtracting the second image from the first image. In some embodiments, the method further includes aligning content of the first image and the second image prior to generating the compound image.

In any of the embodiments described above in relation to the method of FIG. 22, the method may further include locating the object in the compound image. The method may also further include identifying a feature of the object in at least one of the images, e.g. at least in the second image. In some embodiments, if the feature of the object is identified in the first image, then it is referred to as a first instance of the feature; if the feature of the object is identified in the second image, then it is referred to as a second instance of the feature; and if the feature of the object is identified in the compound image, then it is referred to as a third instance of the feature. In some embodiments, the method may include obtaining the first instance and the second instance of the feature and selecting one of the first instance and the second instance as a selected identified feature. In some embodiments, the method may include obtaining the first instance and the third instance of the feature and selecting one of the first instance and the third instance as a selected identified feature. In some embodiments, the method may include obtaining the second instance and the third instance of the feature and selecting one of the second instance and the third instance as a selected identified feature. In some embodiments, the method may include obtaining the first instance, the second instance, and the third instance of the feature and selecting one of the first instance, second instance, and third instance as a selected identified feature.

In any of the embodiments described above in relation to the method of FIG. 22, the method may further include aligning the content of the first image and the second image. The alignment may involve computing a displacement vector representing the displacement of the content between the first image and the second image, and then applying the displacement vector to pixels of the either the first image or the second image. In some embodiments, the plurality of digital images further includes a third image acquired with light emitted from the illuminator, where the first image, the second image, and the third image are successive in time, where the displacement vector is a first displacement vector, and where computing the first displacement vector includes: computing a second displacement vector representing the displacement of the content between the first image and the third image, and then obtaining the first displacement vector from the second displacement vector. For example, the first displacement vector may be proportional to the second displacement vector, e.g. the first displacement vector may be a fraction of the second displacement vector. For example, the first displacement vector may be obtained by dividing the second displacement vector by a number greater than one, e.g. dividing the second displacement vector by two. If the first displacement vector is referred to as D1 and the second displacement vector is referred to as D2, then in some embodiments D1=k×D2, where 0<k<1. k may be 0.5. If the first image is referred to as image "A", the second image is referred to as image "B", and the third image is referred to as image "C", then in some embodiments the first displacement vector may be calculated as the second displacement vector multiplied by time between images A-B and divided by the time between images A-C. In some embodiments, different sections of the images may require different displacement vectors. For example, between image A and image C, and/or between image A and B, some content may move (e.g. the vehicle) and other content may not move (e.g. the background).

In any of the embodiments described above in relation to the method of FIG. 22, each one of the first image and the second image may be of the object. The object may have a retroreflective material. The object may be a vehicle license plate, and each one of the plurality of digital images may include the vehicle license plate. The vehicle license plate may have a retroreflective material. When the object is a vehicle license plate, and when the method includes identifying a feature of the object, then the feature identified may be one or more symbols on the vehicle license plate that comprise the vehicle registration identifier.

Further to the above, some specific examples are provided below.

Example 1: A system comprising: at least one image acquisition device to acquire a plurality of digital images, wherein the plurality of digital images includes a first image acquired with light emitted from an illuminator, and a second image acquired without or with less of the light emitted from the illuminator; a memory to store the plurality of digital images; a processor to: generate a compound image from the first image and the second image; align content of the first image and the second image prior to generating the compound image; and locate an object in the compound image.

Example 2: The system of example 1, wherein the plurality of digital images is of the object, and wherein the object has a retroreflective material.

Example 3: The system of example 1 or 2, wherein the processor is to align the content of the first image and the second image by computing a displacement vector representing the displacement of the content between the first image and the second image, and then applying the displacement vector to pixels of the either the first image or the second image.

Example 4: The system of example 3, wherein the plurality of digital images further includes a third image acquired with light emitted from the illuminator, wherein the first image, the second image, and the third image are successive in time, wherein the displacement vector is a first displacement vector, and wherein computing the first displacement vector comprises: computing a second displacement vector representing the displacement of the content between the first image and the third image; and obtaining the first displacement vector from the second displacement vector.

Example 5: The system of any one of examples 1 to 4, further comprising the illuminator.

Example 6: The system of example 5, wherein the processor is to control the image acquisition device to acquire the first image and control the illuminator to emit the light in order to synchronize light emission by the illuminator with acquisition of the first image.

Example 7: The system of any one of examples 1 to 6, wherein the processor is to generate the compound image from the first image and the second image by combining the first image and the second image.

Example 8: The system of example 7, wherein the processor is to generate the compound image by subtracting the second image from the first image.

Example 9: The system of any one of examples 1 to 8, wherein the processor is further to identify a feature of the object in the second image.

Example 10: The system of example 9, wherein the feature identified in the second image is a second instance of the identified feature, wherein the processor is to also identify the feature in the first image to obtain a first instance of the identified feature, and wherein the processor is further to select one of the first instance and the second instance as a selected identified feature.

Example 11: The system of example 9 or 10, wherein the object is a license plate, and the feature is a vehicle registration identifier on the license plate.

Example 12: The system of any one of examples 1 to 10, wherein the object is a license plate.

Example 13: A system comprising: a memory to store a plurality of digital images, wherein the plurality of digital images includes a first image that was acquired with light emitted from an illuminator, and a second image that was acquired without or with less of the light emitted from the illuminator; a processor to: generate a compound image from the first image and the second image, content of the first image and the second image having been aligned; and locate an object in the compound image.

Example 14: The system of example 13, wherein the plurality of digital images is of the object, and optionally wherein the object is a license plate having a retroreflective material.

Example 15: The system of example 13 or 14, wherein the processor is to align the content of the first image and the second image by computing a displacement vector representing the displacement of the content between the first image and the second image, and then applying the displacement vector to pixels of the either the first image or the second image.

Example 16: A method comprising: activating an illuminator to emit light, and acquiring a first image with light emitted from the illuminator; acquiring a second image without or with less of the light emitted from the illuminator; generating a compound image from the first image and the second image; aligning content of the first image and the second image prior to generating the compound image; and locating an object in the compound image.

Example 17: The method of example 16, wherein both the first image and the second image are of the object, and wherein the object has a retroreflective material.

Example 18: The method of example 16 or 17, wherein the aligning comprises computing a displacement vector representing the displacement of the content between the first image and the second image, and then applying the displacement vector to pixels of the either the first image or the second image.

Example 19: The method of example 18, further comprising acquiring a third image with light emitted from the illuminator, wherein the first image, the second image, and the third image are successive in time, wherein the displacement vector is a first displacement vector, and wherein computing the first displacement vector comprises: computing a second displacement vector representing the displacement of the content between the first image and the third image; and obtaining the first displacement vector from the second displacement vector.

Example 20: The method of any one of examples 16 to 19, comprising controlling an image acquisition device to acquire the first image and controlling the illuminator to emit the light in order to synchronize light emission by the illuminator with acquisition of the first image.

Example 21: The method of any one of examples 16 to 20, wherein generating the compound image comprises combining the first image and the second image.

Example 22: The method of example 21, wherein generating the compound image comprises subtracting the second image from the first image.

Example 23: The method of any one of examples 16 to 22, further comprising identifying a feature of the object in the second image.

Example 24: The method of example 23, wherein the feature identified in the second image is a second instance of the identified feature, and wherein the method further comprises identifying the feature in the first image to obtain a first instance of the identified feature, and selecting one of the first instance and the second instance as a selected identified feature.

Example 25: The method of example 23 or 24, wherein the object is a license plate, and the feature is a vehicle registration identifier on the license plate.

Example 26: The method of any one of examples 16 to 24, wherein the object is a license plate.

Example 27: A method comprising: retrieving from memory a plurality of digital images, wherein the plurality of digital images includes a first image that was acquired with light emitted from an illuminator, and a second image that was acquired without or with less of the light emitted from the illuminator; generating a compound image from the first image and the second image; aligning content of the first image and the second image prior to generating the compound image; and locating an object in the compound image.

Example 28: The method of example 27, wherein the plurality of digital images is of the object, and optionally wherein the object is a license plate having a retroreflective material.

Example 29: The method of example 27 or 28, wherein the aligning comprises computing a displacement vector representing the displacement of the content between the first image and the second image, and then applying the displacement vector to pixels of the either the first image or the second image.

Although the foregoing has been described with reference to certain specific embodiments, various modifications thereof will be apparent to those skilled in the art without departing from the scope of the claims appended hereto.

The invention claimed is:

1. An automated license plate recognition system comprising:
 a first image acquisition device to acquire at least a first image of a vehicle license plate;
 a second image acquisition device to acquire at least a second image of the vehicle license plate with a different exposure level from the first image;
 a memory to store at least the first image and the second image;
 a processor to:
  obtain a plurality of images of the vehicle license plate comprising at least the first image and the second image;
  identify a vehicle registration identifier on the vehicle license plate in at least one of the plurality of images selected according to a confidence measure that the vehicle registration identifier is identifiable.

2. The system of claim 1, wherein the plurality of images further comprise a third image of the vehicle license plate generated based on combining the first image and the second image.

3. The system of claim 1, wherein the processor is to select the at least one of the plurality of images for identifying the vehicle registration identifier therein based on pixel intensities of the plurality of images.

4. The system of claim 1, wherein the processor is to execute an auto-exposure algorithm to determine exposure levels for the first image acquisition device to acquire the first image and the second image acquisition device to acquire the second image.

5. The system of claim 4, wherein the exposure levels are defined by at least one exposure time, gain, or iris.

6. The system of claim 1, wherein the vehicle license plate has a retroreflective material.

7. The system of claim 1, wherein the first image of the vehicle license plate is acquired with light emitted from an illuminator, and the second image of the vehicle license plate is acquired without or with less of the light emitted from the illuminator.

8. The system of claim 7, further comprising the illuminator, and wherein the processor is to control the first image acquisition device to acquire the first image and control the illuminator to emit the light in order to synchronize light emission by the illuminator with acquisition of the first image.

9. The system of claim 1, wherein the plurality of images further comprise a third image of the vehicle license plate generated by subtracting the second image from the first image.

10. The system of claim 9, wherein the processor is to align the content of the first image and the second image by obtaining at least one displacement vector representing displacement of the content between the first image and the second image, and applying the at least one displacement vector to pixels of either the first image or the second image.

11. The system of claim 10, wherein the at least one displacement vector represents static displacement of the content between the first image and the second image.

12. The system of claim 10, wherein the at least one displacement vector represents static and dynamic displacement of the content between the first image and the second image, and wherein obtaining the at least one displacement vector comprises computing the at least one displacement vector.

13. The system of claim 10, wherein the at least one displacement vector is a plurality of displacement vectors, each one of the plurality of displacement vectors corresponds to a respective section in the first and second image.

14. The system of claim 1, wherein the processor is further to align content of the first image and the second image.

15. The system of claim 1, wherein the processor is to align content of the first image and the second image based on static displacement of content between the first image and the second image.

16. The system of claim 15, wherein the processor is to align content of the first image and the second image based on the static displacement and dynamic displacement of the content between the first image and the second image.

17. The system of claim 1, wherein the first image acquisition device is a first infrared camera, the second image acquisition device is a second infrared camera, the first image is a first monochrome image, and the second image is a second monochrome image.

18. The system of claim 1, wherein the confidence measure includes a confidence score.

19. A method of recognizing a vehicle license plate comprising:
acquiring at least a first image of the vehicle license plate;
acquiring at least a second image of the vehicle license plate with a different exposure level from the first image;
obtaining a plurality of images of the vehicle license plate comprising at least the first image and the second image; and
identifying a vehicle registration identifier on the vehicle license plate in at least one of the plurality of images selected according to a confidence measure that the vehicle registration identifier is identifiable.

20. A non-transitory processor-readable medium having stored thereon instructions that, when executed by one or more processors, cause the one or more processors to perform operations comprising:
acquiring at least a first image of the vehicle license plate;
acquiring at least a second image of the vehicle license plate with a different exposure level from the first image;
obtaining a plurality of images of the vehicle license plate comprising at least the first image and the second image; and
identifying a vehicle registration identifier on the vehicle license plate in at least one of the plurality of images selected according to a confidence measure that the vehicle registration identifier is identifiable.

* * * * *